(12) United States Patent
Pottier et al.

(10) Patent No.: US 9,176,282 B2
(45) Date of Patent: Nov. 3, 2015

(54) HIGH EFFICIENCY MONO-ORDER CONCAVE DIFFRACTION GRATING

(71) Applicant: VALORBEC S.E.C., Montreal (CA)

(72) Inventors: Pierre Pottier, Montreal (CA); Muthukumaran Packirisamy, Pierrefonds (CA)

(73) Assignee: VALORBEC S.E.C., Montreal (CA)

( * ) Notice: Subject to any disclaimer, the term of this patent is extended or adjusted under 35 U.S.C. 154(b) by 0 days.

(21) Appl. No.: 14/350,140

(22) PCT Filed: Oct. 5, 2012

(86) PCT No.: PCT/CA2012/050706
§ 371 (c)(1),
(2) Date: Apr. 7, 2014

(87) PCT Pub. No.: WO2013/049942
PCT Pub. Date: Apr. 11, 2013

(65) Prior Publication Data
US 2014/0233891 A1    Aug. 21, 2014

Related U.S. Application Data

(60) Provisional application No. 61/544,093, filed on Oct. 6, 2011.

(51) Int. Cl.
*G02B 6/34* (2006.01)
*G02B 6/12* (2006.01)
*G02B 6/28* (2006.01)
(Continued)

(52) U.S. Cl.
CPC ... *G02B 6/34* (2013.01); *G01J 3/20* (2013.01);
*G02B 6/124* (2013.01); *G02B 6/12007* (2013.01); *G02B 6/29328* (2013.01); *G02B 27/4244* (2013.01); *G01J 3/0256* (2013.01);
(Continued)

(58) Field of Classification Search
CPC .... G02B 6/29328; G02B 27/4244; G01J 3/20
See application file for complete search history.

(56) References Cited

U.S. PATENT DOCUMENTS 4,306,763 A    12/1981    Huignard
4,786,133 A    11/1988    Gidon et al.
(Continued)

FOREIGN PATENT DOCUMENTS

CN    1406020 A    3/2003
CN    2579093 Y    10/2003
(Continued)

OTHER PUBLICATIONS

International Search Report and Written Opinion issued on Jan. 18, 2013, for corresponding PCT Application No. PCT/CA2012/050706, 8 pages.
(Continued)

*Primary Examiner* — Jerry Rahll
(74) *Attorney, Agent, or Firm* — Senniger Powers LLP

(57) ABSTRACT

A concave diffraction grating for integrated optics is constructed by replacing the reflective metallic part by either multiple thin elements of metal or multiple elements of dielectric material, each partially reflecting the light, and arranged on elliptical fashion in order to distribute the diffraction/reflection of light and provide aberration-free focusing, by combining diffraction condition and Bragg condition of these curved reflectors.

24 Claims, 22 Drawing Sheets

(51) Int. Cl.
*G02B 27/42* (2006.01)
*G01J 3/20* (2006.01)
*G02B 6/293* (2006.01)
*G02B 6/124* (2006.01)
G02B 5/18 (2006.01)
G01J 3/02 (2006.01)
G01J 3/18 (2006.01)

(52) U.S. Cl.
CPC ............... *G01J 3/18* (2013.01); *G02B 5/1814* (2013.01); *G02B 5/1861* (2013.01)

(56) References Cited

U.S. PATENT DOCUMENTS

| | | | |
|---|---|---|---|
| 5,107,359 | A | 4/1992 | Ohuchida |
| 5,450,511 | A | 9/1995 | Dragone |
| 6,052,213 | A | 4/2000 | Burt et al. |
| 6,097,863 | A | 8/2000 | Chowdhury |
| 6,226,426 | B1 | 5/2001 | Magne et al. |
| 6,434,299 | B1 | 8/2002 | Yudin et al. |
| 6,766,077 | B2 | 7/2004 | Packirisamy et al. |
| 6,768,841 | B2 | 7/2004 | He |
| 6,879,441 | B1 | 4/2005 | Mossberg |
| 7,151,635 | B2 | 12/2006 | Bidnyk et al. |
| 7,315,426 | B2 | 1/2008 | Kim et al. |
| 7,376,307 | B2 | 5/2008 | Singh et al. |
| 7,474,824 | B2 | 1/2009 | Bidnyk et al. |
| 7,492,530 | B2 | 2/2009 | Kim et al. |
| 2003/0011769 | A1 | 1/2003 | Rakuljic et al. |
| 2003/0095305 | A1 | 5/2003 | Kewitsch et al. |
| 2004/0240063 | A1 | 12/2004 | Delage et al. |
| 2005/0286570 | A1 | 12/2005 | Xiang |
| 2006/0093012 | A1 | 5/2006 | Singh et al. |
| 2007/0086703 | A1 | 4/2007 | Kirk et al. |
| 2008/0285919 | A1 | 11/2008 | Ho et al. |
| 2009/0225424 | A1 | 9/2009 | Zimmer et al. |
| 2009/0310913 | A1 | 12/2009 | Bidnyk et al. |

FOREIGN PATENT DOCUMENTS

| | | |
|---|---|---|
| JP | 8-213709 A | 8/1996 |
| RU | 87 013 | 9/2009 |

OTHER PUBLICATIONS

M.K. Smit, "New focusing and dispersive planar component based on an optical phased array", Electron. Lett., 24 (7), 385-386 (1988).

M. S. D. Smith and K. A. McGreer, "Diffraction Gratings Utilizing Total Internal Reflection Facets in Littrow Configuration", IEEE Photonics Technol. Lett., 11 (1), 84-86 (1999).

B. B. Jian, "Etched Corner Reflector Array Lasers: A Detailed Study", IEEE Photonics Technol. Lett., 8 (12), 1609-1611 (1996).

P. Pottier, S. Mastroiacovo, and R. M. De La Rue, "Power and polarization beam-splitters, mirrors, and integrated interferometers based on air-hole photonic crystals and lateral large index-contrast waveguides", Opt. Express, 14 (12), 5617-5633 (2006).

J. Brouckaert, W. Bogaerts, P. Dumon, S. K. Selvaraja, G. Roelkens, D. Van Thourhout, and R. Baets, "Planar Concave Grating Demultiplexer with Distributed Bragg Reflection Facets", 4th IEEE International Conference on Group IV Photonics, paper WA5, Tokyo, Japan, Sep. 19-21, 2007.

W. Bogaerts, S. K. Selvaraja, P. Dumon, J. Brouckaert, K. De Vos, D. Van Thourhout, and R. Baets, "Silicon-on-Insulator Spectral Filters Fabricated With CMOS Technology", IEEE J. Sel. Top. Quantum Electron., 16 (1), 33-44 (2010).

K. A. McGreer, "A Flat-Field Broadband Spectrograph Design", IEEE Photonics Technol. Lett., 7 (4), 397-399 (1995).

HIGH EFFICIENCY MONO-ORDER CONCAVE DIFFRACTION GRATING

RELATED APPLICATION

This application claims the benefit of and is a National Phase Entry of International Application Number PCT/CA2012/050706 filed Oct. 5, 2012, and claims the benefit of U.S. Provisional Patent Application No. 61/544,093 filed on Oct. 6, 2011, both of which are incorporated herein by reference in their entirety.

TECHNICAL FIELD

The application relates to diffraction gratings for planar optics.

BACKGROUND

Multiplexing and demultiplexing in optical communication systems are implemented in multiple different forms. Early implementations included using: 1) bulk optics with a diffraction grating and lens to spread wavelengths angularly; 2) cascading dielectric thin film interference filters which each let through one wavelength and reflect others to eventually separate all the wavelengths; and 3) fiber Bragg gratings in which one wavelength is reflected in the fiber, which can be cascaded to extract wavelengths of interest. These early implementations are bulky and suffer from problems relating to size, alignment, packaging, and instability over time. More recently, further implementations have been developed that are integrated assemblies to overcome the above-identified problems. These more recent implementations include: 1) Mach-Zehnder filters, which obtain wavelength separation information due to wavelength dependant phase differences between two arms of the device; 2) concave diffraction gratings, which use a metal coated diffraction grating to spread the wavelengths; and 3) arrayed waveguide gratings, which use an array of waveguides to create phase differences so that wavelengths recombine at different locations. Such implementations have lead to substantial improvements compared to the earlier technologies, but each of these new techniques still has some limitations.

Cascaded Mach-Zehnder filters have a large footprint compared to arrayed waveguide gratings and concave diffraction gratings, especially for large numbers of channels.

Concave diffraction gratings (CDG) need a relatively deep etching to make the grating. Furthermore, the grating needs to be metalized to improve efficiency. The smoothness and verticality of the grating is a limiting factor, but the continuous improvement of fabrication technologies will make it less problematic over time. The metallization of the grating is delicate in the fabrication process, as it requires an angled deposition. Although metalized, the grating configuration has losses, and the efficiency is limited. Some other configurations have been proposed to avoid metallization, like using a retro-reflector with total internal reflection. These alternatives have their own theoretical sources of loss as well as losses due to fabrication, such as rounding of corners at the facets of the grating.

Arrayed waveguide gratings (AWG) have a larger size than concave diffraction gratings. FIG. 1 illustrates an example of an arrayed waveguide 100 which includes an input waveguide 110 coupled to a first slab free space region 120, a second slab free space region 140, an array of waveguides 130 having different lengths between the first and second slab free space regions 120, 140 and multiple waveguides 150 coupled to the second slab free space region 140.

CDGs are reflection based devices, which reduces the size by a factor of two as compared to AWGs, which are transmission based devices. Furthermore, AWGs use an array of curved waveguides to produce phase differences, which takes a major portion of the overall device size, whereas a CDGs use only the grating. Also, as the number of channels increases, limitations such as phase errors, and crosstalk occur, which restrict performance. In addition, the physical size of the device increases with the number of channels, making the device larger than desirable for some uses. The efficiency of AWGs has a further limitation, namely due to the fact that there is a field distribution mismatch at a connection between the first slab free space region 120 and the array of waveguides 130, a part of the transmitted light is lost and may propagate as stray light causing deteriorating crosstalk with other channels. CDGs do not suffer from this.

Since worldwide telecommunications traffic is still growing (and is forecasted to continue), the potential of wavelength division multiplexing (WDM) plays an important role in this growth. Indeed, WDM components allow many channels to be transmitted simultaneously on the same fiber, and they can be added to already deployed optical fibers to increase their capacity, without the need to replace or add fibers (which would represent a huge cost). Consequently, the number of channels a WDM system can handle is an important parameter, and higher numbers will be in demand to sustain the ever increasing traffic.

In alternative uses to optical communication systems, such as integrated spectrometer devices, increased capacity for multiplexers translates into higher resolution and the span of the spectrum that can be analyzed simultaneously. Trying to improve the efficiency and capacity of the multiplexers is a subject of current research in this area.

Overall size of devices is also a major issue driving improvements in this field. Smaller packaged devices will occupy less space in telecom cabinets or for hand-held spectrometers. As the cost of production of a chip is roughly proportional to the space it occupies on a wafer (packaging omitted), prices will drop by making devices smaller. For example, if the size of a device can be reduced by a factor 10, it can be made 100 times cheaper.

SUMMARY OF THE INVENTION

According to an aspect of the invention, there is provided a device which combines diffraction and reflection from a grating and a Bragg stack and substantially focuses the beams.

According to an aspect of the invention, there is provided a device which has a diffraction grating where the reflection is obtained in a distributed fashion (not localized laterally nor longitudinally at each individual facet) and in a continuous fashion (from facet to facet fitting into each other).

According to an aspect of the invention there is provided a device which has a diffraction grating wherein the elements providing the reflection are curved (for their reflective properties in relation to their neighbours and/or for focusing).

According to a further aspect of the invention, there is provided a device which combines diffraction and reflection from a grating formed from a Bragg stack, the grating having a plurality of elements, the grating substantially focusing waves reflected off the grating.

According to yet another aspect of the invention, there is provided a device which has a diffraction grating comprising a plurality of elements where reflection is obtained in a distributed and continuous fashion.

According to still a further aspect of the invention, there is provided a device which has a diffraction grating comprising a plurality of elements, wherein the elements providing the reflection are curved for their reflective properties in relation to their neighbours and/or for focusing.

In some embodiments the elements providing the reflection are substantially locally parallel.

In some embodiments the elements providing the reflection are substantially locally equidistant from one another.

In some embodiments the elements providing the reflection each have a substantially elliptical shape to provide output efficiency and aberration-free focusing with foci located at a device input and a device output.

In some embodiments the elements providing the reflection follow locally the blaze condition.

In some embodiments the elements providing the reflection are substantially narrow.

In some embodiments the elements providing the reflection are reflective by the nature of the material used.

In some embodiments the elements providing the reflection are metallic.

In some embodiments the elements providing the reflection are dielectrics.

In some embodiments a grating diffraction condition and a Bragg condition are based on different optical path differences, but each optical path difference is substantially a multiple of a signal wavelength.

In some embodiments the grating diffraction condition and the Bragg condition are based on substantially the same optical path differences and the optical path difference is substantially a multiple of a signal wavelength.

In some embodiments the elements providing the reflection have a limited width.

In some embodiments the elements providing the reflection have a width of $(2k+1)\lambda/(4n)$, further corrected for oblique incidence, wherein k is an integer.

In some embodiments the elements providing the reflection are obtained by local modification of the index of refraction.

In some embodiments the elements providing the reflection are air, gas or vacuum grooves in silicon dioxide.

In some embodiments the elements providing the reflection are air, gas or vacuum grooves in silicon.

In some embodiments the elements providing the reflection are air, gas or vacuum grooves in III-V semiconductor elements.

In some embodiments the elements providing the reflection are filled with one of a solid material or a liquid material.

In some embodiments the elements providing the reflection are etched through the slab waveguide core.

In some embodiments the elements providing the reflection are shallow etched.

In some embodiments the elements providing the reflection are obtained by means other than etching.

In some embodiments the elements providing the reflection are obtained by doping/implantation.

In some embodiments the elements providing the reflection and the input and output waveguides of the integrated device are obtained in the same fabrication step (e.g. etching, doping, etc).

In some embodiments the refractive index difference between the elements providing the reflection is high (e.g. 3/1) and consequently the number of required elements is low.

In some embodiments the refractive index difference between the elements providing the reflection is moderate (e.g. 1.5/1) and consequently the number of required elements is moderate.

In some embodiments the refractive index difference between the elements providing the reflection is low (e.g. 1.46/1.45) and consequently the number of required elements is high.

In some embodiments the elements providing the reflection do not present an abrupt change of index of refraction ($n_1$ to $n_2$, $n_2$ to $n_1$) or an abrupt change of material from one to another, but instead can present a progressive change of index of refraction or material composition. An example is a sinusoidal variation of index of refraction with $n_1$ as maxima and $n_2$ as minima. The average refractive index value could be $(n_1+n_2)/2$, $n_1$, $n_2$ or any appropriate value, and the difference could be $n_2-n_1$ or any appropriate value.

In some embodiments at least a part of the refractive index (or material composition) distribution of the elements providing the reflection (e.g. the grating front part) presents an apodization along the direction locally perpendicular to the diffraction grating, i.e. the contrast of refractive index (or material composition) undergoes a progressive change from e.g. 0 to its nominal value.

In some embodiments at least a part of the refractive index (or material composition) distribution of the elements providing the reflection (e.g. the grating front part) presents an apodization along the direction of the length of the elements, i.e. the contrast of refractive index (or material composition) undergoes a progressive change from e.g. 0 to its nominal value.

In some embodiments the device operates at optical wavelengths.

In some embodiments the device operates at visible wavelengths.

In some embodiments the device operates at optical communications wavelengths, in particular, but not limited to, around 1.5 µm.

In some embodiments the device is used for wavelength division multiplexing (multiplexer, demultiplexer).

In some embodiments the device operates at emission wavelengths of elements (atoms, fluorophores, quantum dots, etc.).

In some embodiments the diffraction grating has the echelette grating configuration.

In some embodiments the diffraction grating has the echelle grating configuration.

In some embodiments the device operates in a non-integrated way, such as using bulk optics.

In some embodiments the device is based on the Rowland configuration, where light input and output locations are substantially on the Rowland circle and where the grating front is tangent to the Rowland circle (at the pole) and has a radius of curvature substantially twice the Rowland circle radius.

In some embodiments the device is based on a geometrical configuration which allows the light emanating from the input location to be collected by one or more output locations in a wavelength dependent manner.

According to an aspect of the invention, there is provided a planar waveguide grating device comprising at least an input channel waveguide and a plurality of output channel waveguides, and wherein the grating element that spatially separates wavelengths supplied by the input channel waveguide is made based on the device described above or detailed below.

According to an aspect of the invention, there is provided a planar waveguide grating device comprising at least an input location and a plurality of output locations—these locations being e.g. a facet of the chip, a vertical coupling element, etc, or a mixture of these elements, including channel waveguides—and wherein the grating element that spatially separates wavelengths supplied by the input channel waveguide is made based on the device described above or detailed below.

In some embodiments the planar waveguide grating device is based on the Rowland configuration, where the input and output locations or channel waveguides extremities are substantially on the Rowland circle and where the grating front is tangent to the Rowland circle (at the pole) and has a radius of curvature substantially twice the Rowland circle radius.

In some embodiments the elements providing the reflection start substantially at the grating facet positions of the Rowland configuration.

In some embodiments the elements providing the reflection cross substantially the grating facet positions of the Rowland configuration and start before or after the grating facet positions of the Rowland configuration.

In some embodiments the elements providing the reflection are substantially equidistant along a line bisecting the input-pole and output-pole lines.

In some embodiments the elements providing the reflection start substantially at the grating circle of the Rowland configuration.

In some embodiments the elements providing the reflection start before or after the grating circle of the Rowland configuration.

In some embodiments the planar waveguide grating device is based on geometrical configuration which allow the light emanating from the input location or channel waveguide extremity to be collected by the output locations or channel waveguides extremities (wavelength dependently).

In some embodiments the elements providing the reflection start substantially at the grating front.

In some embodiments the elements providing the reflection start before or after the grating front.

In some embodiments the planar waveguide grating device is configured such that the mean penetration depth of light into the grating corresponds substantially to the position of a regular grating front, i.e. by example the grating circle for the case of a Rowland configuration.

In some embodiments the channel waveguides are oriented towards the grating pole.

In some embodiments the channel waveguides have a free orientation, in particular the one to maximize the light efficiency coupling into them.

In some embodiments the planar waveguide grating device is used for integrated spectrometers.

In some embodiments the planar waveguide grating device is used for spectral measurement on a lab on a chip.

In some embodiments the planar waveguide grating device is used for wavelength selection of an optical source, e.g. a tuneable laser, a pulsed source or a hyperspectral source, where the output or input channel waveguides could be used for, or replaced by, selective elements operating reflection, transmission, absorption, or other light manipulation.

According to an aspect of the invention, there is provided a device that operates by combining diffraction and reflection from a grating and a Bragg stack for general wave phenomenon.

According to an aspect of the invention, there is provided a device that operates by combining diffraction and reflection from a grating and a Bragg stack for electro-magnetic waves.

According to an aspect of the invention, there is provided a device that operates by combining diffraction and reflection from a grating and a Bragg stack for sound.

According to an aspect of the invention, there is provided a device that operates by combining diffraction and reflection from a grating and a Bragg stack for mechanical waves.

According to an aspect of the invention, there is provided a device that operates by combining diffraction and reflection from a grating and a Bragg stack for surface waves.

According to an aspect of the invention, there is provided a device comprising: an arrangement of a plurality of elements, each of the elements having a finite thickness and being spaced apart from adjacent elements, each element having an elliptical shape and being locally parallel to elements located adjacent to the element; a grating surface defined by ends of at least a subset of the plurality of elements; a first port and at least one second port located at foci of an ellipse defining the elliptical shape of the plurality of elements.

In some embodiments the plurality of elements each have a reflective metalized surface.

In some embodiments the plurality of elements each have an index of refraction that is different than that of the surrounding medium.

In some embodiments the plurality of elements substantially form a Bragg reflective grating.

In some embodiments the first port and at least one second port fall on a Rowland circle, and at least a portion of the grating surface fall on a Rowland configuration grating circle.

In some embodiments the foci of the ellipse are located at substantially the same location.

In some embodiments the device is configured to filter a wide band source into specific tuneable wavelengths, wavelength bands, or a spectral distribution.

In some embodiments the device is configured to couple together multiple single wavelengths or narrow wavelength bands to create at least one of a wide band source or a powerful (high intensity) source.

In some embodiments the device uses a combination of materials having indices of refraction $n_2$ and $n_1$ and include at least one of: silica ($n_2$) in silica ($n_1$); air ($n_2$) in silica ($n_1$); air ($n_2$) in silicon ($n_1$); and silica ($n_2$) in silicon ($n_1$).

According to an aspect of the invention, there is provided a device using a diffraction grating and a Bragg stack to separate wavelengths, in particular to spread them angularly.

According to an aspect of the invention, there is provided a device which provides substantially a single diffraction order.

In some embodiments the device is fabricated from at least two materials having different indices of reference.

In some embodiments the at least two materials are two or more of: silica, doped silica, silicon nitride, silicon oxynitride, silicon, or a polymer.

In some embodiments the device uses a configuration of one Bragg mirror period per diffraction grating period.

In some embodiments at least a part of the diffraction grating has a non-constant period.

In some embodiments the non-constant period undergoes a progressive change for the benefit of the control of the focusing of the beam and the localisation of the outputs.

In some embodiments at least a part of the Bragg mirror has a non-constant period.

In some embodiments the non-constant period undergoes a progressive change to control specific properties of the device.

In some embodiments at least a part of the grating front has a non-constant curvature.

In some embodiments the non-constant curvature undergoes a progressive change for the benefit of control of the focusing of the beam and the localisation of the outputs.

In some embodiments at least a part of the elements providing the reflection have a non-constant inclination angle with respect to a surface of the grating.

In some embodiments the non-constant inclination angle undergoes a progressive change for the benefit of the control of the focusing of the beam and the localisation of the outputs.

BRIEF DESCRIPTION OF THE DRAWINGS

Embodiments of the application will now be described with reference to the attached drawings in which.

DETAILED DESCRIPTION

Figure 1:
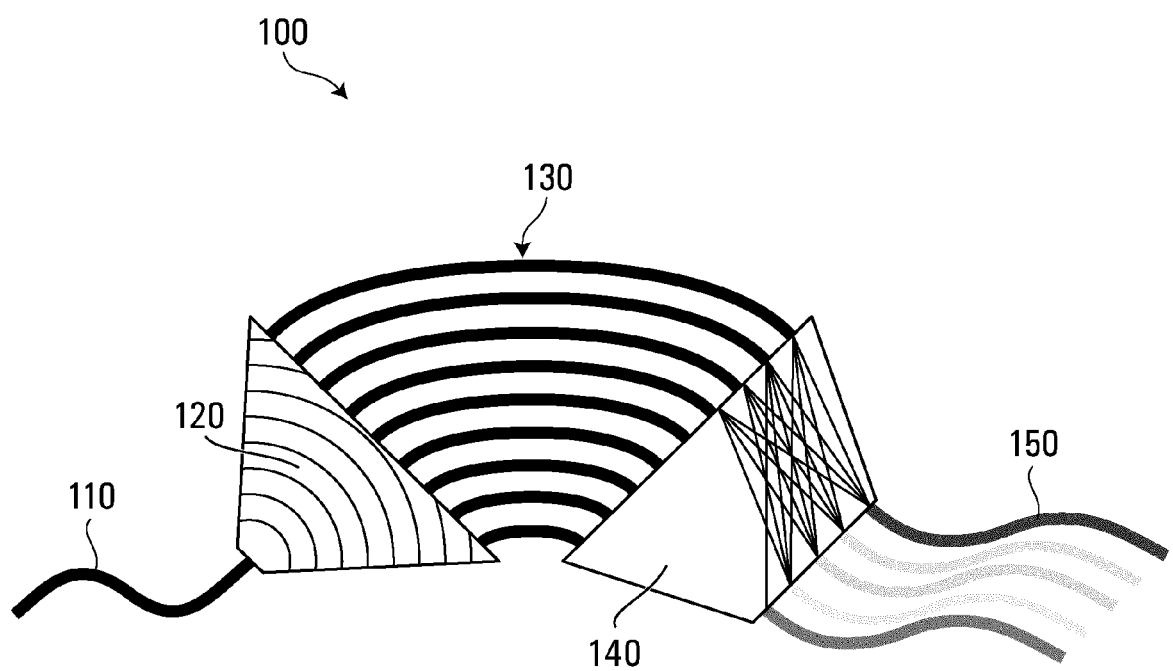
FIG. 1 is a schematic diagram of an arrayed waveguide grating.

Some aspects of the invention deal with using a concave diffraction grating, in which the classical grating is being replaced by a new configuration. In some embodiments, metallization is avoided by replacing the metalized grating by a curved dielectric mirror. This eliminates the difficulty of deposition and enables a grating approaching 100% efficiency. It also reduces sensitivity to polarization. In other embodiments, deep etching is replaced by a shallow etching or other techniques that modify the index of refraction (doping, etc), possibly making it even easier to fabricate. In a further embodiment, metal is used in thin lines, not in a single piece, and has less polarization sensitivity than a single piece metal grating because there are substantially no facet edges. Consequently, present limitations of concave diffraction gratings can be substantially alleviated, resulting in a high-quality device for WDM devices and micro-spectrometer.

Some embodiments of the invention are directed to a new type of diffraction grating for planar integrated optics, which separates the different wavelengths spatially. Two particular applications of such a device are 1) wavelength-division multiplexing (WDM) components for use in optical telecommunications for multiplexing and demultiplexing used to transmit high data rate information over optical fiber networks; and 2) an integrated spectrometer on a chip, for spectroscopy, and for local analysis of multiple elements when integrated in a lab on a chip, for use in the area of, for example, microfluidics. However, it is to be understood that such a diffraction grating may be used in other types of devices that may benefit from advantages described herein. Examples of devices that may include a diffraction grating in accordance with embodiments described herein include a tuneable source with an external source or with the source integrated on a chip or a tuneable laser with an external cavity using a movable diffraction grating. In such an example, wavelength selection of an optical source could be performed by tuning the grating part or a free-space region (region between the waveguide(s) and the grating) by, for example, changing the index of refraction. This could be done, for example, by using an electro-optic or thermo-optic effect.

In some implementations a broad source (like e.g. a supercontinuum source) could be filtered into specific tuneable wavelengths or wavelength bands, a spectral distribution. Alternatively, multiple single wavelengths, such as lasers, or narrow band sources, such as LEDs, could be coupled together to create a wide band source, or to create a powerful (high intensity) source.

In comparison to other solutions, for example those described above, some embodiments of the present invention may result in devices with one or more of the following advantages: higher efficiency, for example less loss, less sensitivity to polarization, easier fabrication processes, higher throughput capacity and smaller size. Consequently as a result of the smaller size, in some embodiments, devices as described herein may also be cheaper to manufacture.

Some embodiments of the present invention provide solutions to existing problems in optical multi/demultiplexing systems, optical biosensing, and spectrometers. Examples of problems that may be overcome by some embodiments of the present invention are: 1) limited efficiency of etched concave diffraction gratings and of arrayed waveguide gratings; 2) fabrication difficulties of etched concave diffraction gratings; 3) size occupied by arrayed waveguide gratings; 4) limited number of multiplexed channels of arrayed waveguide gratings; and 5) polarization sensitivity of metalized concave diffraction gratings.

Figure 2:
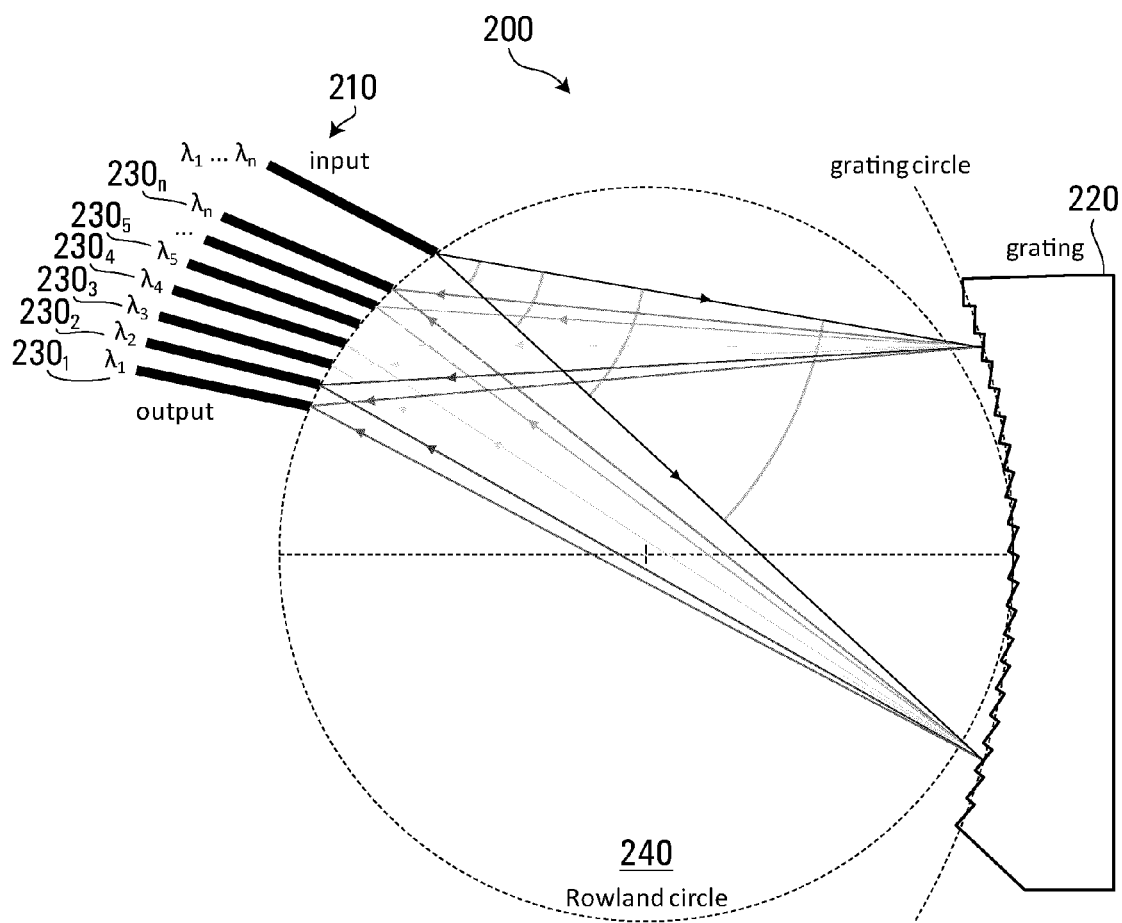
FIG. 2 is a schematic diagram of an Integrated Rowland concave diffraction grating.

Integrated concave diffraction gratings such as illustrated in FIG. 2 use a diffraction grating to disperse different wavelengths coming from one source into several outputs. FIG. 2 shows an assembly 200 including an input source 210, possibly a fiber or a waveguide, containing all wavelengths $\lambda_1 \ldots \lambda_n$ of light being transmitted. A curved grating 220, usually based on a Rowland configuration, is used to focus the input back into separate outputs $230_1 \ldots 230_n$ one output for each of wavelengths $\lambda_1 \ldots \lambda_n$ respectively. That is, the input 210 and outputs $230_1 \ldots 230_n$ are placed on the Rowland circle 240 (radius $R_{RC}$), and the grating 220 has a radius of curvature of $2R_{RC}$ and is tangent to the Rowland circle 240. Light is guided vertically using a slab waveguide, and it is either guided laterally (lateral waveguides) or free in the region between the lateral waveguides and the grating 220. The grating 220 is etched in the slab waveguide. Using media with different indices of refraction, for example air in the etched region and silica in the slab region, the refractive index difference between the two regions provides some reflection for each facet of the grating, but it is very limited and inefficient. For the purposes of further discussion, the conventional curved diffraction grating without metalized grating will be referred to as Case 1.

Figure 3A:
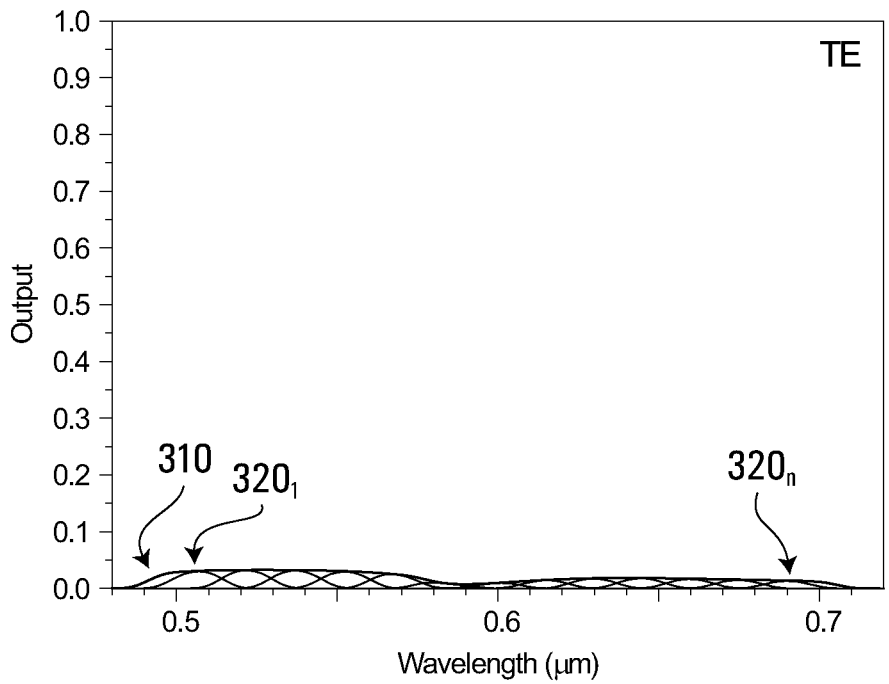
FIGS. 3A and 3B are graphical plots of optical output through individual channels of an unmetalized classical concave diffraction grating (Case 1) and for the overall bandwidth of all of the individual channels, for TE and TM polarizations, respectively.
Figure 3B:
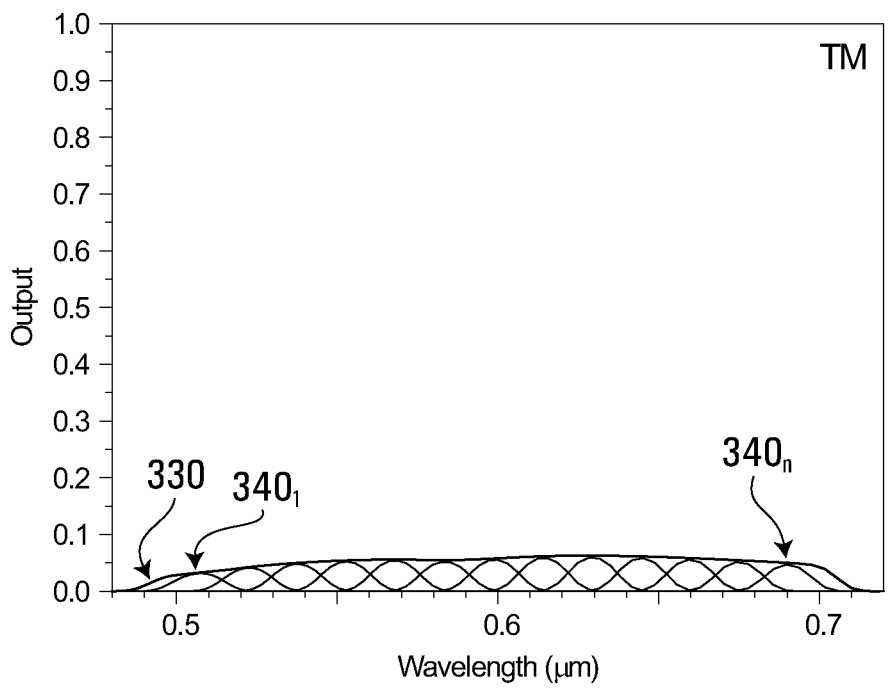

A finite difference time domain (FDTD) tool has been used to simulate operation of the gratings. FDTD solves Maxwell's equations of electro-magnetic waves in discretized time and space. Simulations have been performed in two dimensions, with the effective index of a slab waveguide used as the refractive index. Throughout this document when referring to similar types of simulations, the refractive index values refer to effective refractive indices for the integrated device using a slab waveguide. In FIGS. 3A and 3B, simulations show the efficiency of a grating as described with reference to FIG. 2. The general parameters are: $n_1=1.5$, $\lambda=600$ nm, M=−2, $\alpha=-15°$, $\beta=-45°$, $R_{RC}=50$ μm, a=828 nm. $n_1$ is the index of refraction of the medium, $\lambda$ is the wavelength (in vacuum), M is the grating diffraction order, $\alpha$ and $\beta$ are the incident and diffracted angle on the grating, and a is the grating period. FIGS. 3A and 3B in particular show an overall bandwidth including multiple individual channels for TE and TM polarization, respectively. In each of the plots of FIGS. 3A and 3B the x-axis represents wavelength and is expressed in micrometers (μm). The y-axis represents a normalized output and is expressed in a range of 0 to 1 (0 to 100%). In FIG. 3A reference character 310 illustrates the passband of the overall bandwidth and reference characters $320_1$ and $320_n$ identify two individual channels in the overall bandwidth 310 for TE polarization. In FIG. 3B reference character 330 illustrates the passband of the overall bandwidth and reference characters $340_1$ and $340_n$ identify two individual channels in the overall bandwidth 330 for TM polarization. In the particular example simulation there is a silica/air interface and the grating is etched.

Figure 4A:
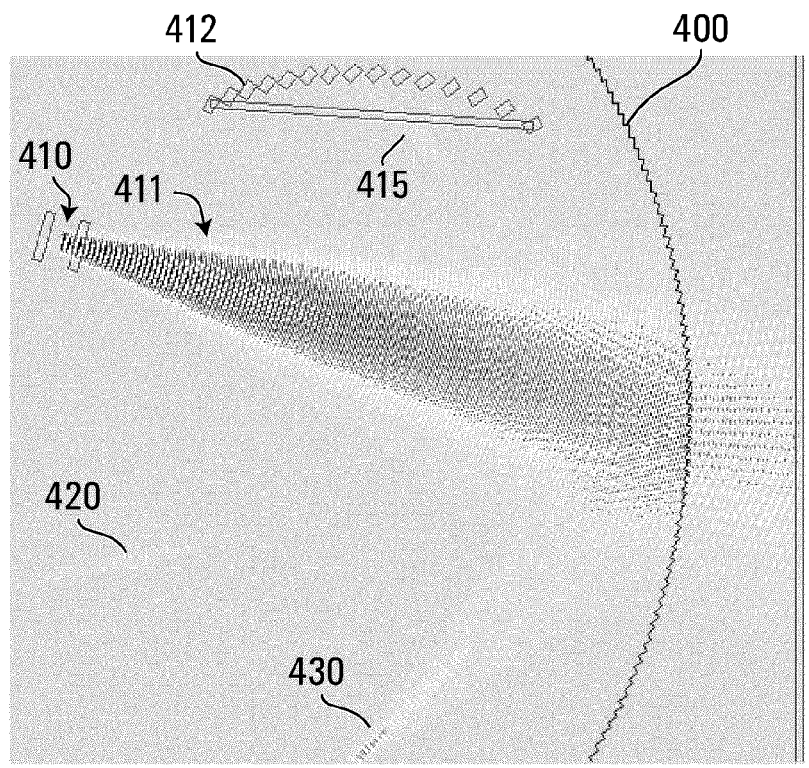
FIGS. 4A and 4B are schematic diagrams of a modelled spatial distribution of light interacting with an unmetalized classical concave diffraction grating (Case 1) for TE and TM polarizations, respectively.
Figure 4B:
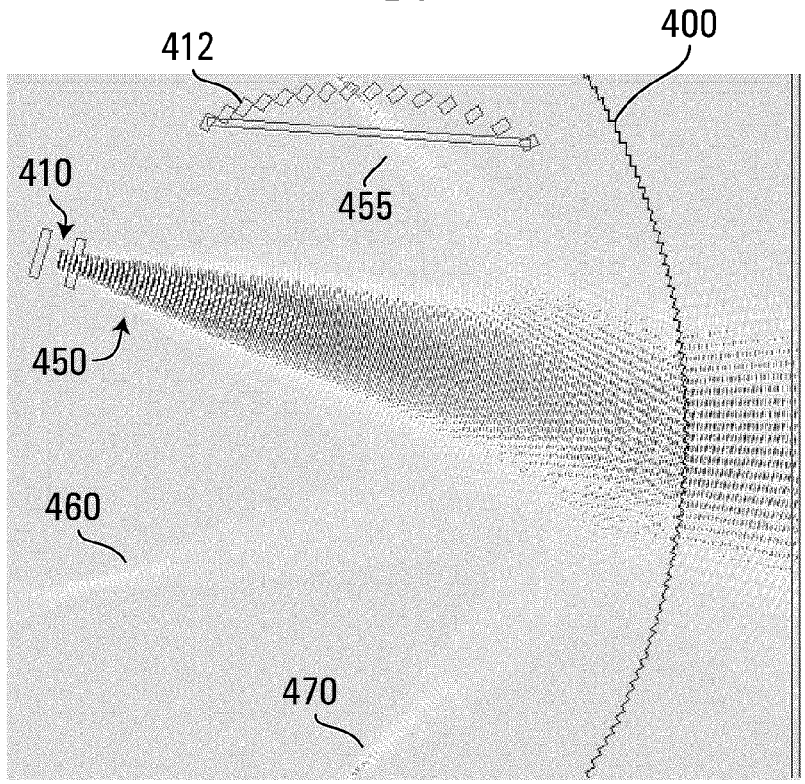

From FIGS. 3A and 3B it can be seen that reflection off the grating from the input to the output is low: 1% for TE polarization and 6% for TM polarization. TE and TM refer respectively to electric and magnetic field in the plane of the slab waveguide (i.e. the two dimensional simulation plane). Light is being lost in other diffraction orders and as transmitted through the grating. This can be clearly seen in FIGS. 4A and 4B, which show the spatial distribution of light for a continuous wave simulation interacting with a curved diffraction grating along the lines of that described in FIG. 2. In FIG. 4A for TE polarization, reference number 410 denotes an input source and reference number 411 denotes the continuous wave from the input source 410. The continuous wave 411 impinges on the diffraction grating 400 and one diffraction order 415 is directed to an array of outputs 412. Due to the multi-order nature of the diffraction, other orders 420 and 430 can be seen being generated in other directions from that of the outputs 412. In FIG. 4B for TM polarization, a similar phenomenon can be seen in which a continuous wave 450 from input source 410 generates order 455 directed to the outputs 412 and other orders 460 and 470 directed elsewhere. The polarization-dependant loss of this device is 7.7 dB.

Figure 5A:
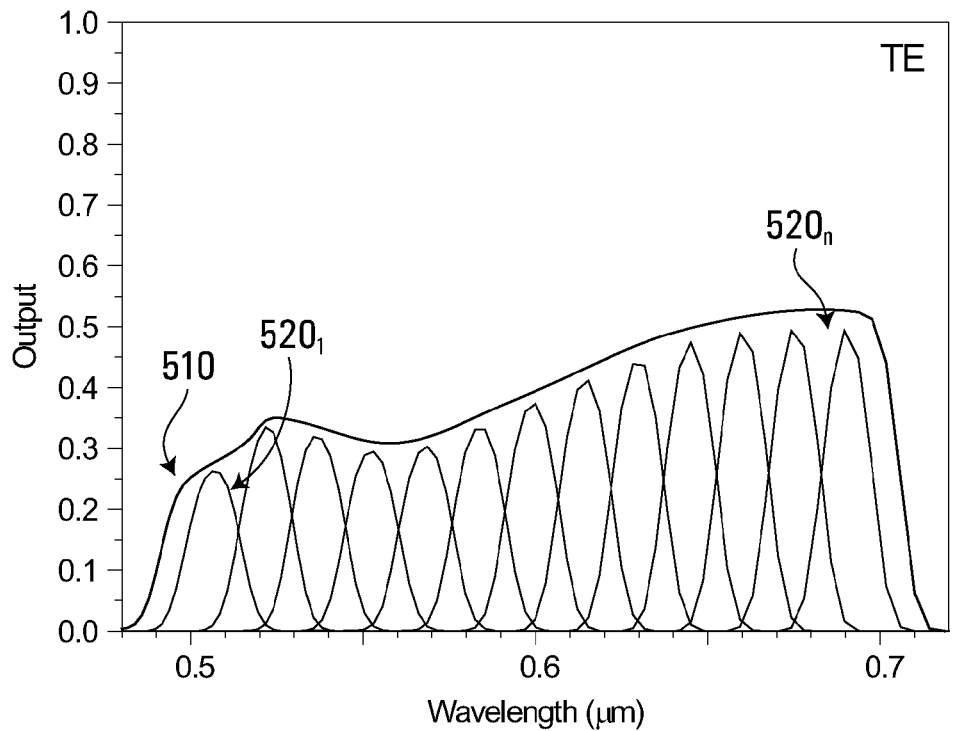
FIGS. 5A and 5B are graphical plots of optical output through individual channels of a metalized concave diffraction grating (Case 2) and for the overall bandwidth of all of the individual channels, for TE and TM polarizations, respectively.
Figure 5B:
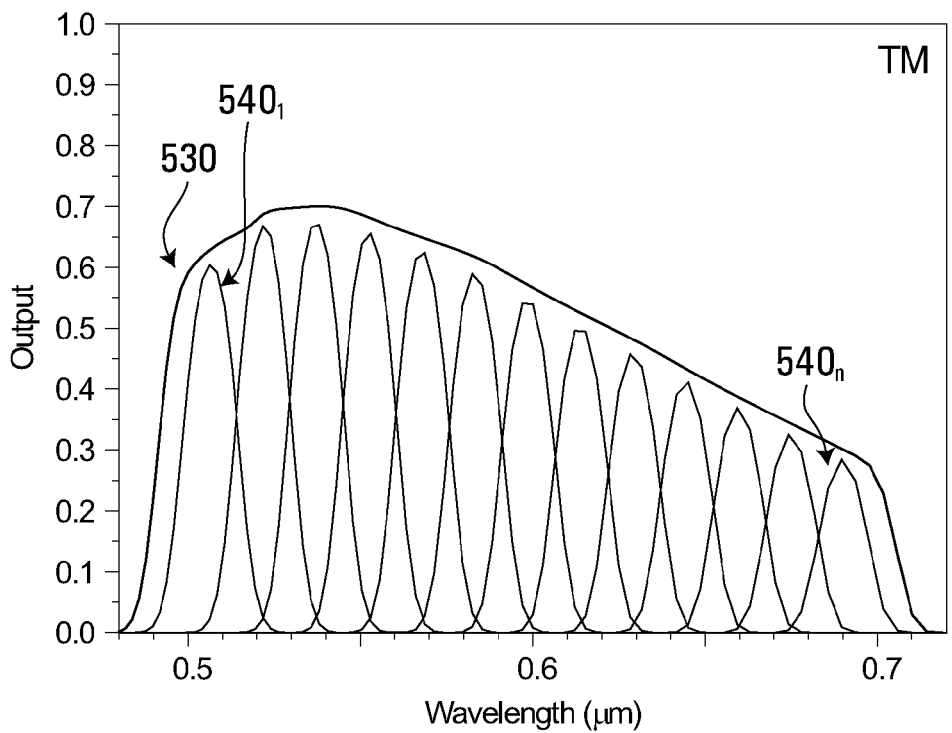

By metalizing the facets of the grating, the efficiency improves significantly. For the purposes of further discussion, the conventional curved diffraction grating with metalized grating surface will be referred to as Case 2. FIGS. 5A and 5B show an overall bandwidth including multiple individual channels for TE and TM polarization, respectively. For comparison sake to FIGS. 3A and 3B, general parameters are kept the same, and the previously etched region considered to be air in FIG. 2 is replaced by aluminum. The reflected light at the output increases to 39% (TE) and 57% (TM) as seen in FIGS. 5A and 5B. The x and y-axes of the plots in FIGS. 5A and 5B are the same wavelength range and normalized output as that of FIGS. 3A and 3B. In FIG. 5A reference character 510 illustrates the passband of the overall bandwidth and reference characters $520_1$ and $520_n$ identify two individual channels in the overall bandwidth 510 for TE polarization. In FIG. 5B reference character 530 illustrates the passband of the overall bandwidth and reference characters $540_1$ and $540_n$ identify two individual channels in the overall bandwidth 530 for TM polarization.

Figure 6A:
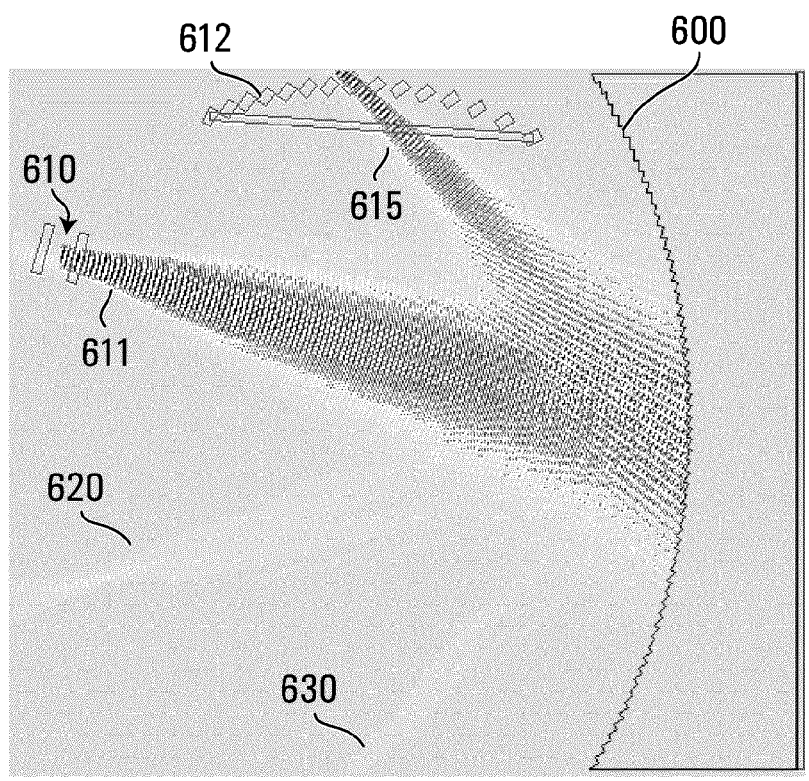
FIGS. 6A and 6B are schematic diagrams of a modelled spatial distribution of light of a metalized concave diffraction grating (Case 2) for TE and TM polarizations, respectively.
Figure 6B:
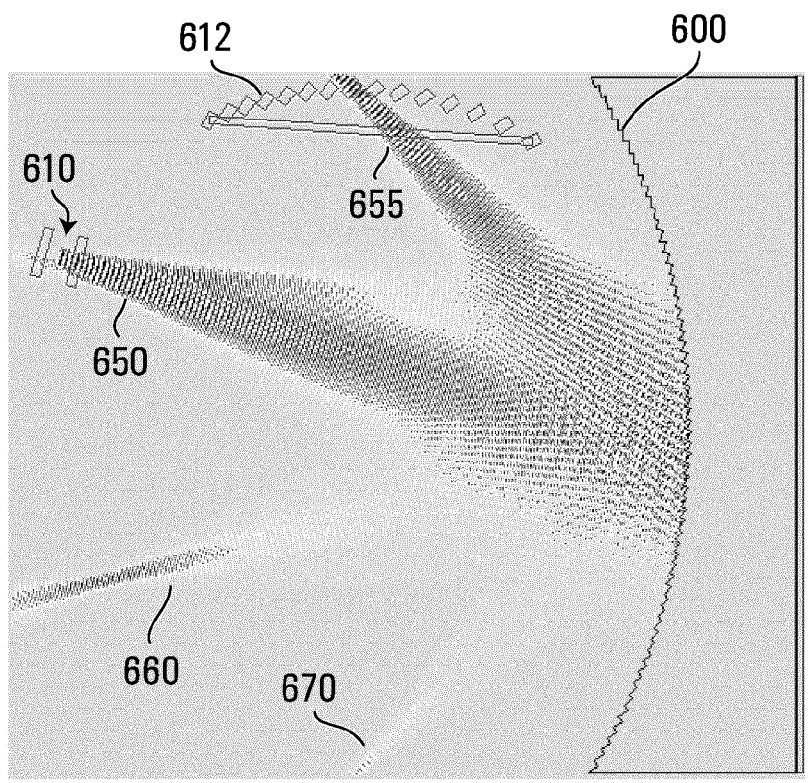

For the Case 2 situation, the metallization of the grating prevents light from escaping in transmission and reinforces significantly the reflection. However, this is not ideal as there is still light being diffracted in several other diffraction orders as can be clearly seen in FIGS. 6A and 6B, even though the facets are blazed, which means the facets are locally reflecting the input into the output, which gives the maximum efficiency to the grating. In FIG. 6A for TE polarization, reference number 610 denotes an input source and reference number 611 denotes the continuous wave from the input source 610. The continuous wave 611 impinges on the diffraction grating 600 and one order 615 is directed to an array of outputs 612. Due to the multi-order nature of the diffraction, other orders 620 and 630 can be seen being generated in other directions from that of the outputs 612. In FIG. 6B for TM polarization, a similar phenomenon can be seen in which a continuous wave 650 from input source 610 generates one order 655 directed to the outputs 612 and other orders 660 and 670 directed elsewhere. Also, losses occur from the absorption of metal and scattering of facets. There are also issues with the edges between two facets (also called side facets or non-reflecting facets) arising from the boundary conditions, which are different for TE and TM modes, creating polarization dependence and a disturbance that can excite various diffraction orders. The polarization-dependant loss of this device is 3.6 dB.

Figure 7:
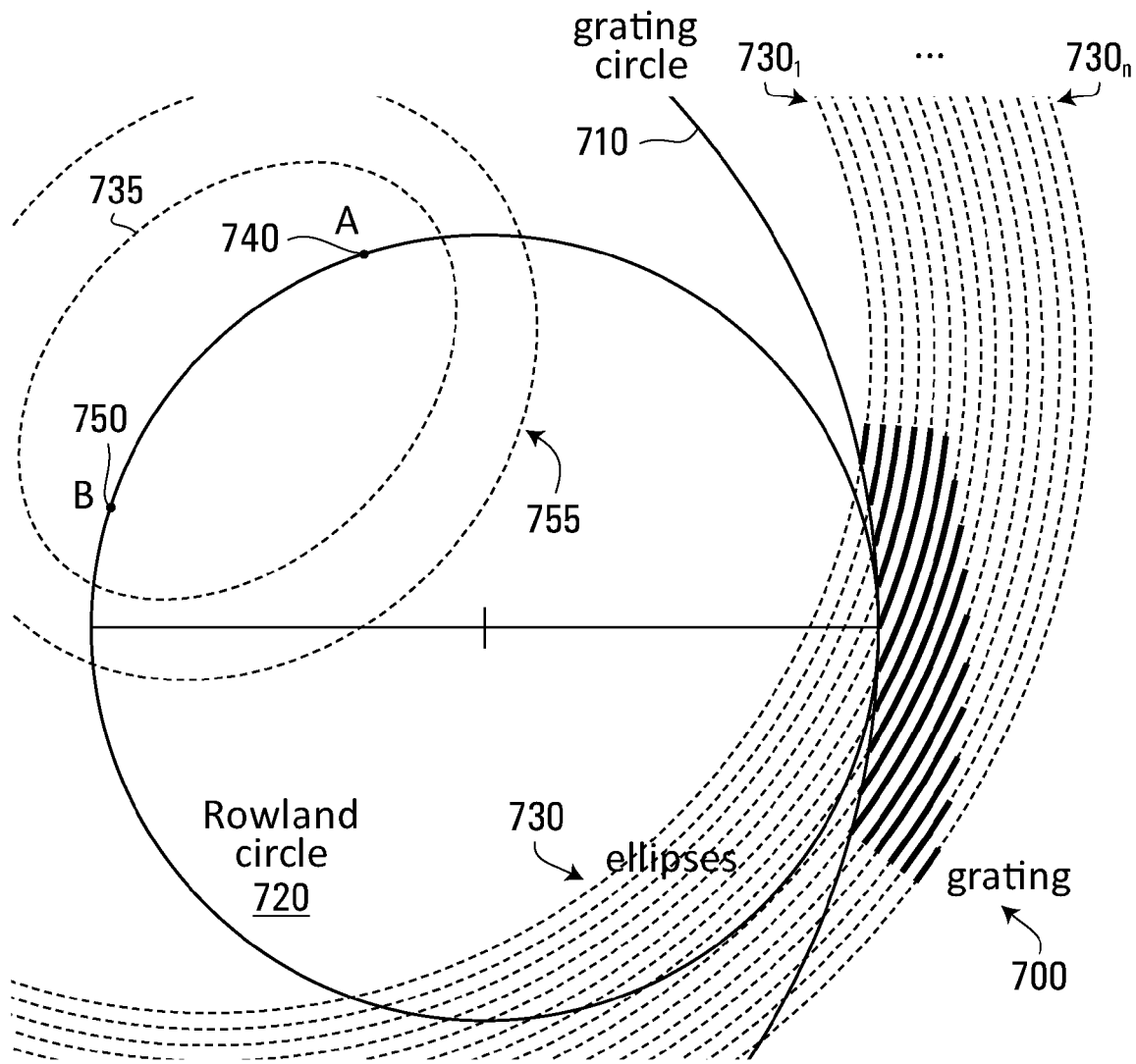
FIG. 7 is a schematic diagram of a concave diffraction distributed elliptical element grating (Case 3 or 4) according to an embodiment of the invention.

In a first embodiment of the invention, the reflection is obtained by replacing the one-piece metallic grating of the conventional grating of FIG. 2 by a series of thin lines of metal which are formed as part of an ever expanding arrangement of ellipses as illustrated in FIG. 7. With reference to FIG. 7, an ellipse 735 is shown having two foci A 740 and B 750. Similar shaped ellipses, only larger are shown as indicated by reference numbers 755 and $730_1$ to $730_n$. The two foci A 740 and B 750 will be locations of an input and an output of light reflecting off of grating 700. The surface that defines a grating circle is indicated by reference number 710. A Rowland circle 720, which includes the two foci A 740 and B 750, intersects some of ellipses $730_1$ to $730_n$, and is tangential to the grating circle for a portion of the grating circle. The grating 700 is therefore comprised of thin metal lines that follow the elliptical lines $730_1$ to $730_n$ along the grating circle. Each of the lines reflects part of the light, but because they are many lines, substantially all of the light is reflected. The periodicity maintains the diffraction grating condition, and the parallel elliptical lines follow the Bragg's law condition. The combination of these two conditions makes the diffraction grating very efficient for a single diffraction order. The grating is therefore considered to be mono-order. Since the grating is curved, the metal lines are also curved to keep a local parallelism between pairs of adjacent lines (concentric disposition) in order to maintain Bragg's law. More precisely, the lines are arranged on elliptical positions, whose foci are the input and output channels. This configuration corresponds to the blazing condition for optimal throughput. All the light reflected partially from all the metal lines will converge from the input to the output channels, providing substantially aberration-free focusing. In this manner the diffraction grating can be considered a "distributed" diffraction grating, with a "smooth" reconstruction of outgoing waves. The term "distributed" is used because in a similar manner as for a distributed Bragg reflector where the reflection is not a localized property, but a property of the ensemble of the multilayer, some embodiments described herein include a distributed diffraction grating where the reflection and the diffraction do not take place only at the grating front, but inside the whole structure. With regard to the use of the term "smooth", in a classical (metallic) grating, where the light is reflected at each facet, the local beam of light is ended on one side until it joins the beam reflected by the next facet from where the beams form a continuous front. Until that location, the beam can diffract laterally and interact with the side facet, diminishing the grating efficiency. With a distributed grating the contribution added by the next facet is only a small fraction of the power because most of the reflection has already taken place in the distributed grating. As a result, the beam's (lateral) diffraction will be very small. Some embodiments of the invention have almost completely smoothed out the stair-case shape of the grating, from the optical perspective, although its period is still at the origin of the (grating) diffraction effect. The lower the index difference between dielectric stripes, the more smoothed out the reconstructed beam will be. For the thin metal line case, the less reflection per line, that is the thinner the line, the more smoothed out the reconstructed beam will be. Problems associated with an edge between two facets found in the example of FIG. 2 are suppressed since there effectively are no edges, only the parallel lines forming the facets. The outgoing beam is not reconstructed from discontinuous adjacent facets, but from a plurality of parallel metal lines which smooth out the grating inherent discontinuities.

In a particular implementation, the diffraction grating could be used in the Littrow configuration, which involves the input light being reflected back toward the input waveguide. In this situation, the input waveguide and the output waveguide will be the same waveguide and as such the device could utilize a single waveguide. The two foci of the ellipses will be substantially the same location resulting in the special case that the ellipses are actually circles.

Figure 8:
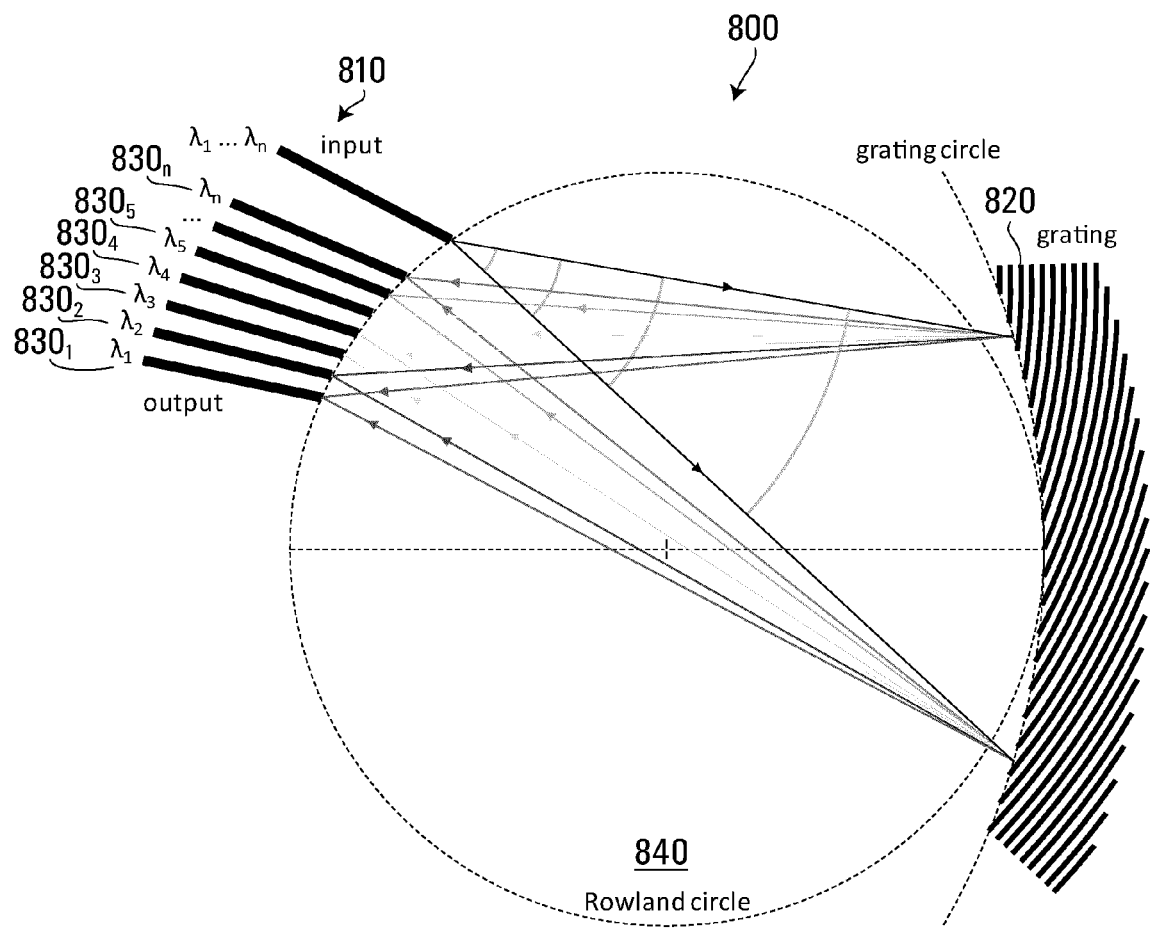
FIG. 8 is a schematic diagram of an integrated concave diffraction elliptical metal line grating (or elliptical distributed Bragg reflector (DBR) grating) according to an embodiment of the invention.

FIG. 8 shows an example assembly 800 including an input source 810 containing all wavelengths $\lambda_1 \ldots \lambda_n$ of light being transmitted. In some embodiments the input source is light emitted by a fiber or waveguide. In some embodiments, a curved grating 820, based on the Rowland configuration, is used to focus the input 810 back into separate outputs $830_1 \ldots 830_n$, one output for each of wavelengths $\lambda_1 \ldots \lambda_n$, respectively. That is, the input 810 and outputs $830_1 \ldots 830_n$ are placed on the Rowland circle 840 (radius $R_{RC}$), and the grating 820 has a radius of curvature of $2R_{RC}$ and is tangent to the Rowland circle 840. It is to be understood that the radius of curvature is not to be limited to only $2R_{RC}$, but could be somewhat more or less than this specific value. In some embodiments the outputs are fibers or waveguides configured to receive particular wavelengths of light. Light is guided vertically using a slab waveguide, and it is either guided laterally (lateral waveguides) or free in the region between the input and outputs and the grating 820. In some embodiments the grating 820 is etched in the slab waveguide. In some embodiments the grating 820 is shallow etched. In some embodiments grating elements providing the reflection are obtained by means other than etching. In some embodiments the grating 820 is obtained by doping and/or implantation.

For the purposes of further discussion, the integrated concave diffraction elliptical thin line grating will be referred to as Case 3.

Figure 9:
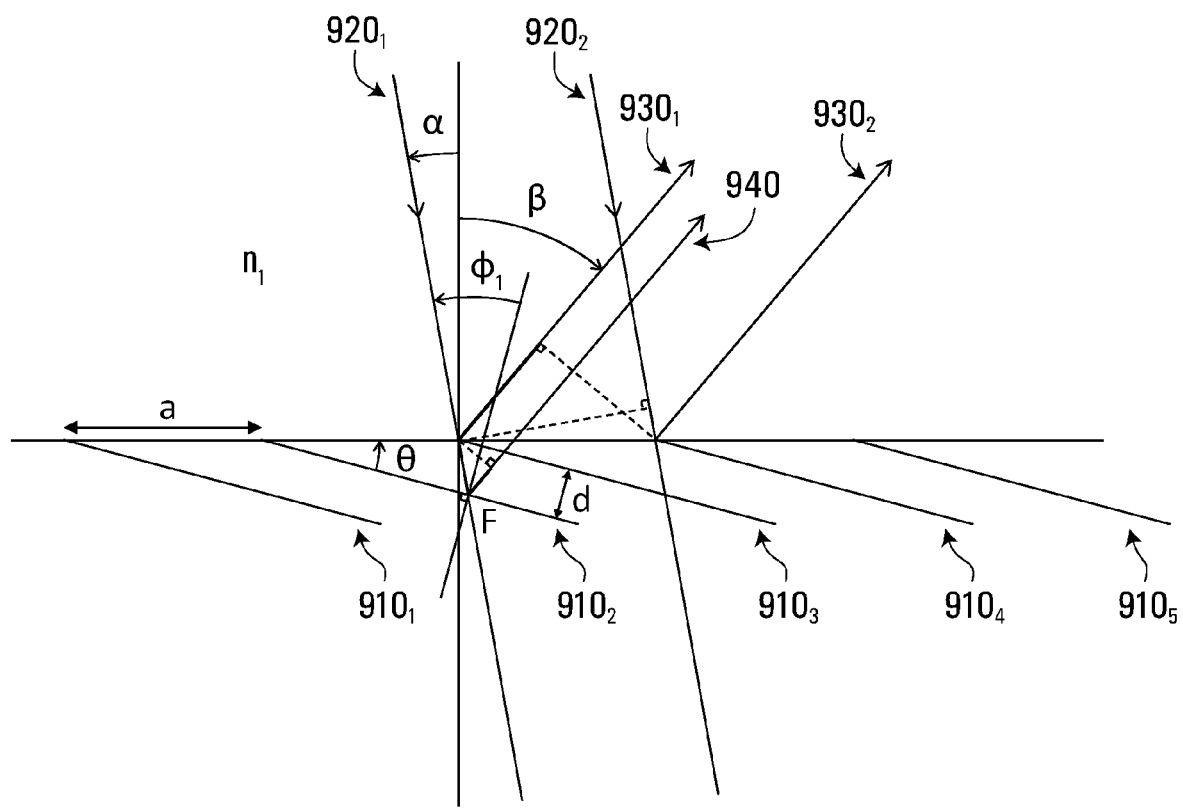
FIG. 9 is a schematic diagram illustrating diffraction conditions and Bragg conditions for a diffraction grating having thin metal lines.

FIG. 9 is a schematic representation of two rays of light impinging on lines that form a portion of a diffraction grating that is substantially flat. While the gratings generally described herein are described as being curved gratings, in a localized area a curved grating can be considered flat. A first light ray $920_1$ is shown being re-emitted from grating line $910_3$ and forming light ray $930_1$. A portion of the first light ray $920_1$ continues past grating line $910_3$ and reflects off of grating line $910_2$ as light ray 940. A second light ray $920_2$ is shown being re-emitted from grating line $910_4$ and forming light ray $930_2$. Additionally in FIG. 9, $\alpha$ and $\beta$ are the incident and diffracted angles of the light rays with regard to a direction that is normal to the grating plane, $\phi_1$ is the incident angle of the light ray with regard to a direction that is normal to the metal line, $\theta$ is the inclination of the grating line with respect to the grating plane, a is the period of the grating, d is the distance between two metal lines in a direction perpendicular to the metal lines, $\lambda$ is the wavelength, $n_1$ is the index of refraction of the medium, and m and M are two integers, respectively (not shown in the figure) corresponding to the Bragg diffraction order and grating diffraction order.

Alternative to light being considered as discrete rays impinging on the grating, light coming from the input channel can also be considered propagating as a spherical-like wave, which is diffracted/reflected by the grating front (Rowland configuration) and the elliptical metal lines as a spherical-like wave back to the output channel, which is equivalent to plane waves diffracted/reflected by a flat configuration. From the differences in optical path, the Bragg's law condition (diffraction from reflection on parallel planes) is given by:

$$2d\cos\varphi_1 = m\frac{\lambda}{n_1}, \quad (1)$$

and the diffraction grating condition is given by:

$$a(\sin\alpha + \sin\beta) = M\frac{\lambda}{n_1}. \quad (2)$$

The inclination θ is determined as 6=(−α−β)/2, and the Bragg period d as d=−a·sin [(α+β)/2]. From the fact that the grating condition works constructively with the Bragg condition when both diffracted angles, the angle made by the light diffracted on the grating (angle β or the angle, with reference to FIG. 9, made by 930₁ with reference to the grating normal) and the angle made by the light reflected on the Bragg stack (the angle made by 940 with reference to the grating normal, i.e. −2φ₁+α), are equal, i.e. when:

$$\alpha - \beta = 2\phi_1, \quad (3)$$

which is actually the blazing condition where efficiency in the given order is maximum, it can be determined that:

$$m = -M. \quad (4)$$

This means the optical path difference from two adjacent grating facets and from two adjacent metal lines has to be the same. Once the grating configuration has been chosen, that is variables n₁, λ, M, α, β are selected, variables a, φ₁, θ and d are determined. The above assumptions are based on infinitely thin metallic lines. Physically, a partial reflection of 20-70% may be obtained by a 10 nm thick metallic layer, which is orders of magnitude smaller than the period, which is itself on the order of μm for optical wavelengths. Therefore, a model based on the above assumptions can be accurately used for thin metal lines.

Figure 10A:
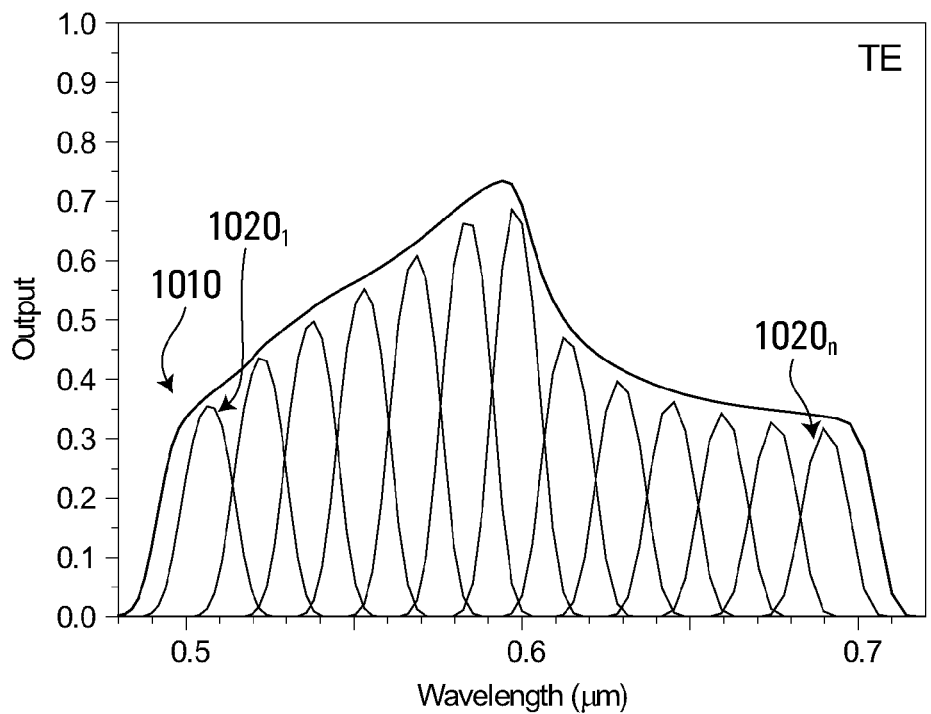
FIGS. 10A and 10B are graphical plots of optical output through individual channels of an elliptical distributed metallic line diffraction grating (Case 3) according to an embodiment of the invention and for the overall bandwidth of all of the individual channels, for TE and TM polarizations.
Figure 10B:
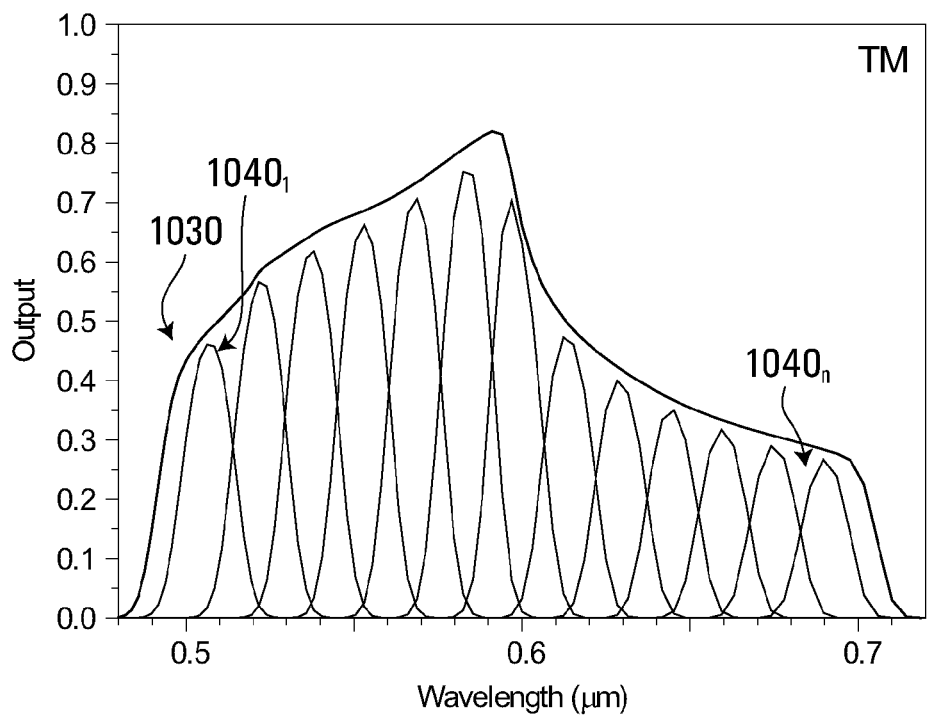

FIGS. 10A and 10B show a simulation of the efficiency of a grating for TE and TM polarization, respectively, as described with reference to FIG. 8 (Case 3). The general parameters used for the simulation of FIGS. 10A and 10B are substantially the same as were defined above for the simulations of FIGS. 3A, 3B, 5A and 5B. The key difference is that the grating is now a series of thin lines of metal that are spaced parallel to one another in an elliptical arrangement with the input and output channels located at the foci of the ellipse formed by the grating, placed in a surrounding medium. In some embodiments the metal may be aluminum. In some embodiments the metal may be gold. In some embodiments the metal may be silver. It is to be understood that these are not the only metals that may be used, but are a non-exhaustive list of example materials. In some embodiments the surrounding medium is silica having an index of refraction, n₁, equal to approximately 1.5. In a particular implementation the width of the thin lines is 10 nm, but it is to be understood that the line width is variable within a range that still enables satisfactory operation of the grating. In the plots of FIGS. 10A and 10B the x and y-axes are the same wavelength range and normalized output as that of FIGS. 3A and 3B. In FIG. 10A reference character 1010 illustrates the passband of the overall bandwidth and reference characters 1020₁ and 1020ₙ identify two individual channels in the overall bandwidth 1010 for TE polarization. In FIG. 10B reference character 1030 illustrates the passband of the overall bandwidth and reference characters 1040₁ and 1040ₙ identify two individual channels in the overall bandwidth 1030 for TM polarization. The reflection efficiency increases to 73% (TE) and 82% (TM), which is an improvement compared to the previously described one-piece metallic grating. Based on the geometry of the grating design there is only a limited amount of energy that is lost to other diffraction orders and therefore, it can be considered that the other diffraction orders are substantially eliminated.

Figure 11A:
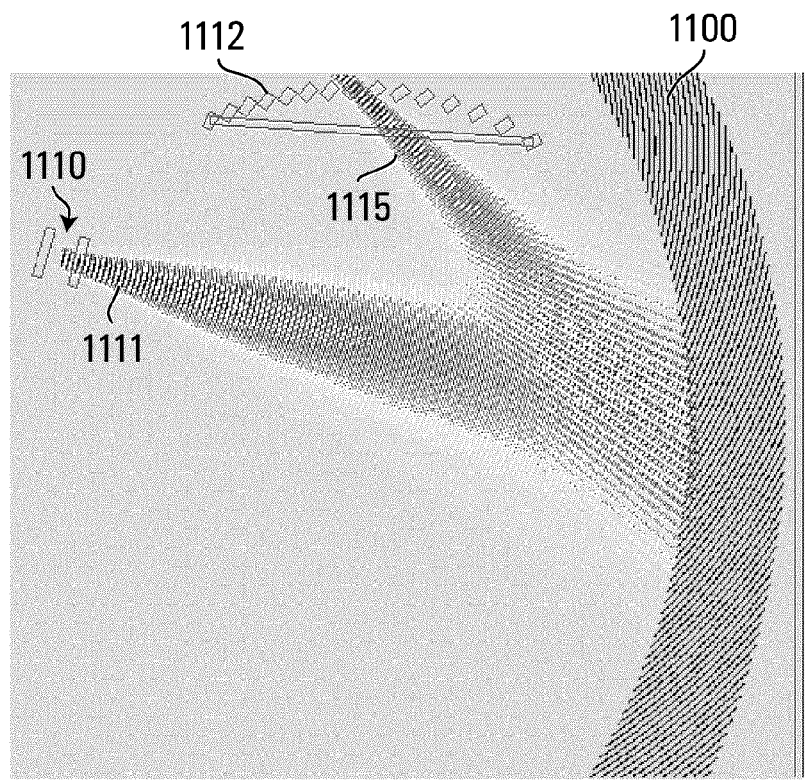
FIGS. 11A and 11B are schematic diagrams of a modelled spatial distribution of light of an elliptical distributed metallic line diffraction grating (Case 3) for TE and TM polarizations, respectively.
Figure 11B:
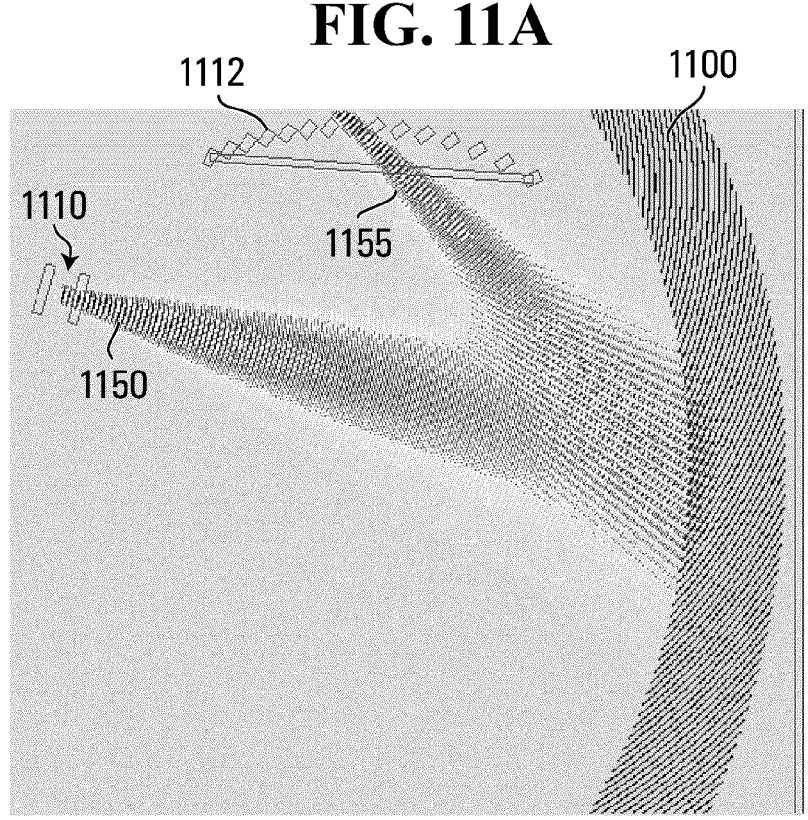

FIGS. 11A and 11B are further simulations which show the lack of other diffraction orders, only a single diffraction order is shown 1115 and 1155 in the TE and TM modes in FIGS. 11A and 11B, respectively. In FIG. 11A for TE polarization, reference number 1110 denotes an input source and reference number 1111 denotes the continuous wave from the input source 1110. The continuous wave 1111 impinges on the diffraction grating 1100 and one order 1115 is directed to an array of outputs 1112. In FIG. 11B for TM polarization, a similar phenomenon can be seen in which a continuous wave 1150 from input source 1110 generates one order 1155 directed to the outputs 1112. Some losses remain, but there is inevitably the intrinsic absorption of metal. The polarization-dependant loss of this device is 1.16 dB.

In a second embodiment of the invention, an innovative aspect consists in replacing the one-piece metal part, as described above with regard to FIG. 2 by a continuously curved dielectric mirror (Bragg mirror, or distributed Bragg reflector (DBR)) to provide the reflection. Such mirrors can have a reflectivity of almost 100%. But these mirrors may not be localized individually at each facet, as they should be extended in width and length to give maximum efficiency. So the configuration found to match both the grating shape and the distributed mirror shape is similar to that of the first embodiment. However, the thin metal lines of the first embodiment are, in some aspects of the second embodiment, replaced by thicker dielectric elements of index n₂, surrounded by the medium of index n₁. For example, the elements may be grooves, filled by a material having an index n₂ if etched in the material of index n₁. Incorporating the dielectric elements provides several potential advantages. Problems associated with metallization of facets, for example, but not limited to absorption, are removed, and a very high reflectivity, virtually 100%, is possible thanks to a dielectric multi-layer stack (DBR). By using ellipses with foci at the input and output channels, such as shown in FIG. 8, in some embodiments it is possible to provide an appropriate blazing condition, aberration-free focusing and combine the diffraction grating condition with the Bragg's law condition. Once again this provides a mono-order focusing grating, with "smooth" reconstruction of beam. The local properties of the Bragg mirror should be kept the same over the entire grating structure. The elliptical configuration described herein with reference to FIG. 8 maintains a local parallelism and a local equidistance between elements, thus providing a continuously deformed Bragg mirror, and in some embodiments, at the same time, an appropriate blazing condition and aberration-free focusing. For the purposes of further discussion, the integrated concave diffraction elliptical DBR grating will be referred to as Case 4.

Figure 12:
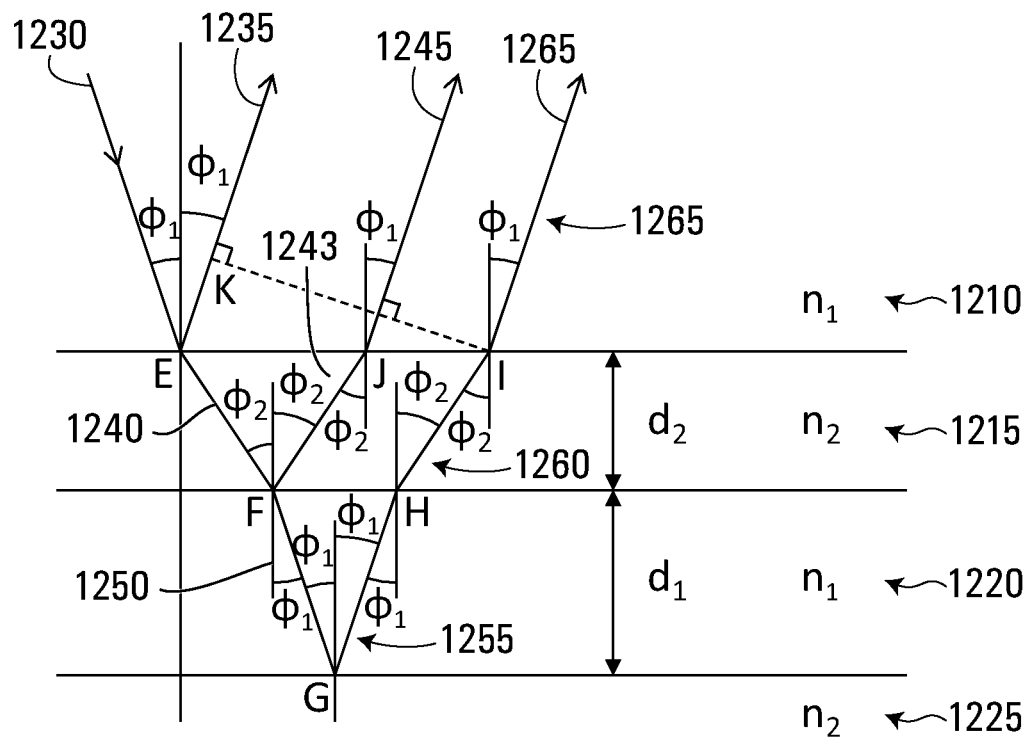
FIG. 12 is a schematic diagram illustrating Bragg conditions for a diffraction grating having a dielectric multilayer.

FIG. 12 illustrates a schematic diagram of a multilayer stack of elements having particular indices of refraction and thicknesses. In particular, a first area 1210 has a refractive index of n₁, a second area 1215 has a refractive index of n₂, a third area 1220 has a refractive index of n₁ and a fourth area 1225 has a refractive index of n₂. The second area 1215 has a thickness d₂ and the third area 1220 has a thickness d₁. The first area 1210 and the fourth area 1225 do not have specific thicknesses defined, but they could be d₁ and d₂, respectively. In some situations, the stack could be extended to be a repeating arrangement of areas having thickness d₂ and index of refraction n₂ and areas having a thickness d₁ and index of refraction $n_1$. A first light ray 1230 impinges on the interface of the first area 1210 and the second area 1215 at an angle $\phi_1$. A light ray 1235 reflects off the interface at an angle $\phi_1$. A light ray 1240 is transmitted into the second area 1215 at an angle $\phi_2$. A light ray 1243 reflects off the interface of the second and third areas at an angle $\phi_2$. Light ray 1243 is transmitted back into the first area 1210 at an angle $\phi_1$ as light ray 1245. A light ray 1250 is transmitted into the third area 1220 at an angle $\phi_1$. A light ray 1255 reflects off the interface of the third and fourth areas at an angle $\phi_1$. Light ray 1255 is transmitted back into the second area 1215 at an angle $\phi_2$ as light ray 1260. Light ray 1260 is transmitted back into the first area 1210 at an angle $\phi_1$ as light ray 1265.

The diffraction grating condition is still given by equation (2). However, the Bragg's law condition now becomes:

$$m\lambda = 2\left[n_1 d_1 \cos\varphi_1 + n_2 d_2 \sqrt{1 - \left(\frac{n_1}{n_2}\right)^2 \sin^2\varphi_1}\right], \quad (5)$$

with $d_2$ the thickness of an element of the stack having of index $n_2$ and $d_1$ the thickness of an element of the stack having of index $n_1$.

Figure 13:
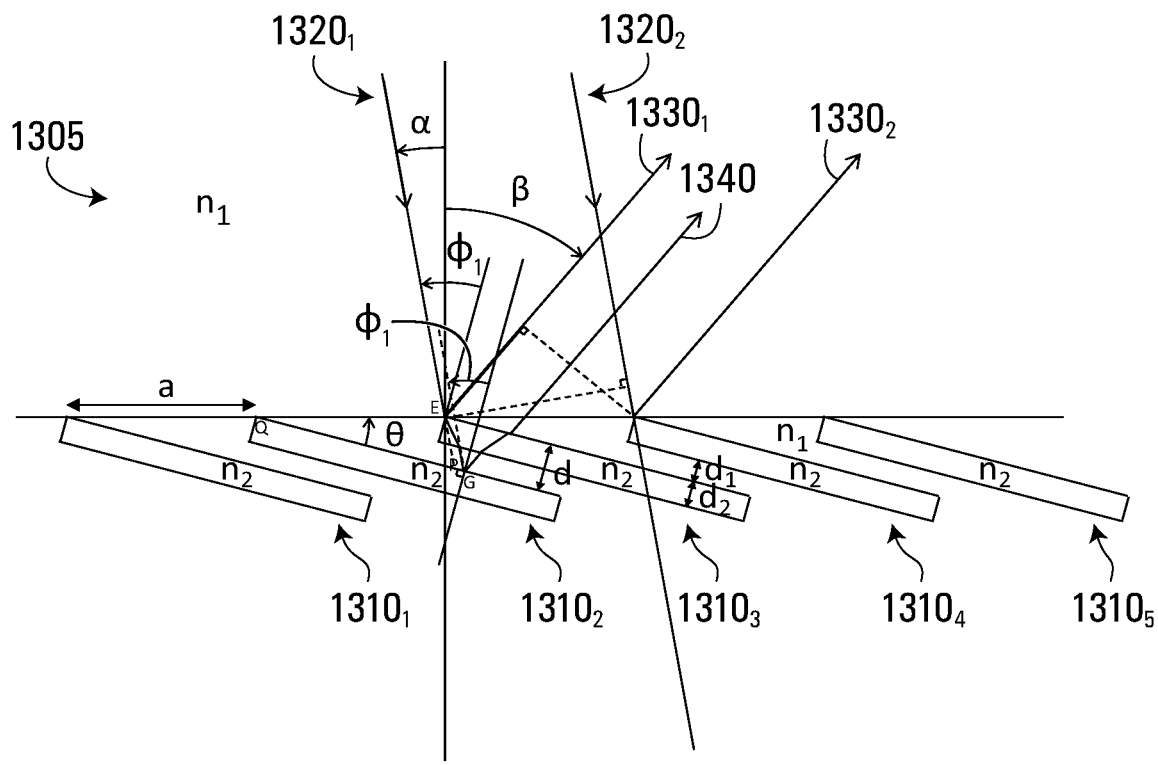
FIG. 13 is a schematic diagram illustrating diffraction conditions and Bragg conditions for a diffraction grating having a dielectric multilayer.

FIG. 13 is a schematic representation of two rays of light impinging on elements that form a portion of a diffraction grating that is substantially flat. While the grating is generally described herein as being a curved grating, in a localized area the curved grating can be considered flat. A first light ray 1320$_1$, originally travelling in an area 1305 having an index of refraction $n_1$, is shown being re-emitted from the grating at a surface of element 1310$_3$, which is an interface between a material having an index of refraction $n_1$ and $n_2$, and forming light ray 1330$_1$. A portion of the first light ray 1320$_1$ passes through the thickness $d_2$ of element 1310$_3$ and then passes through the thickness $d_1$ of material having index of refraction $n_1$, before reflecting off of the surface of element 1310$_2$ as light ray 1340, which passes through the thickness $d_1$ of material having index of refraction $n_1$ and passes through the thickness $d_2$ of element 1310$_3$ before re-entering area 1305. A second light ray 1320$_2$ is shown being re-emitted from the grating at a surface of element 1310$_4$, which is an interface between materials having indices of refraction $n_1$ and $n_2$, and forming light ray 1330$_2$. Additionally in FIG. 13, $\alpha$ and $\beta$ are the incident and diffracted angles of the light rays with regard to a direction that is normal to the grating plane, $\phi_1$ is the incident angle of the light rays with regard to a direction that is normal to the dielectric element, $\theta$ is the inclination of the grating dielectric element with respect to the grating plane, a is the period of the grating, d is the distance between two dielectric elements in a direction perpendicular to the dielectric elements, $\lambda$ is the wavelength, $n_1$ is the index of refraction of the area adjacent the grating and between the dielectric elements, $n_2$ is the index of refraction of the dielectric elements and m and M are two integers (not shown in the figure), respectively corresponding to the Bragg diffraction order and grating diffraction order.

The combination of the two conditions, the diffraction grating and new Bragg's Law condition in equation (5) leads to:

$$f_2 = \frac{\left(1 + \frac{m}{M}\right)\cos\left(\frac{\alpha - \beta}{2}\right)}{\cos\left(\frac{\alpha - \beta}{2}\right) - \sqrt{\left(\frac{n_2}{n_1}\right)^2 - \sin^2\left(\frac{\alpha - \beta}{2}\right)}}, \quad (6)$$

where $$f_2 = \frac{d_2}{d}$$

and $d = d_1 + d_2$. In order to get maximum efficiency of the Bragg mirror:

$$d_1 = \frac{(2k_1 + 1)\lambda}{4n_1 \cos\varphi_1}, \quad (7)$$

with $k_1$ an integer, and:

$$d_2 = \frac{(2k_2 + 1)\lambda}{4n_2 \cos\varphi_2}, \quad (8)$$

with $k_2$ an integer. But these two conditions, equations (7) and (8) may not meet the condition of equation (6) for all embodiments. Nevertheless, the conditions of equations (7) and (8) may be relaxed in some embodiments, while still keeping a high reflectivity, at a potential cost of a reduced stopband width, since the Bragg period is conserved. The grating periodic step may contain one or several stripes, as necessary to provide the optical path differences for conditions (2) and (5). In the particular case when $m = -M$, $f_2$ tends to 0 (eq. (6)). Yet, a situation close to this case can be used, i.e. when $d_2/d$ is relatively small.

Figure 14A:
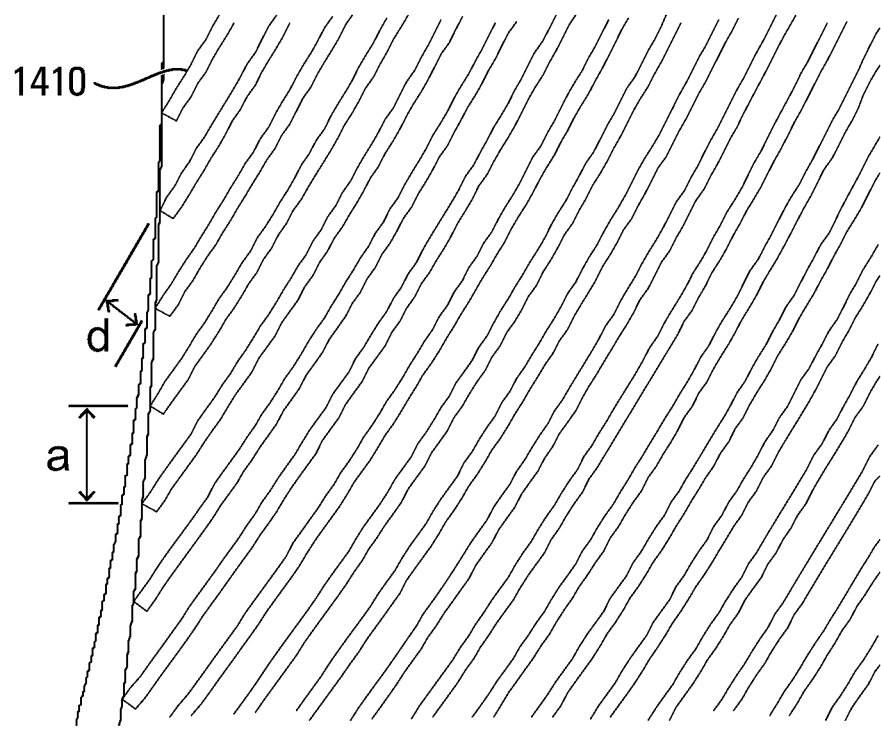
FIG. 14A is an elliptical DBR diffraction grating made with one curved stripe per grating period.
Figure 14B:
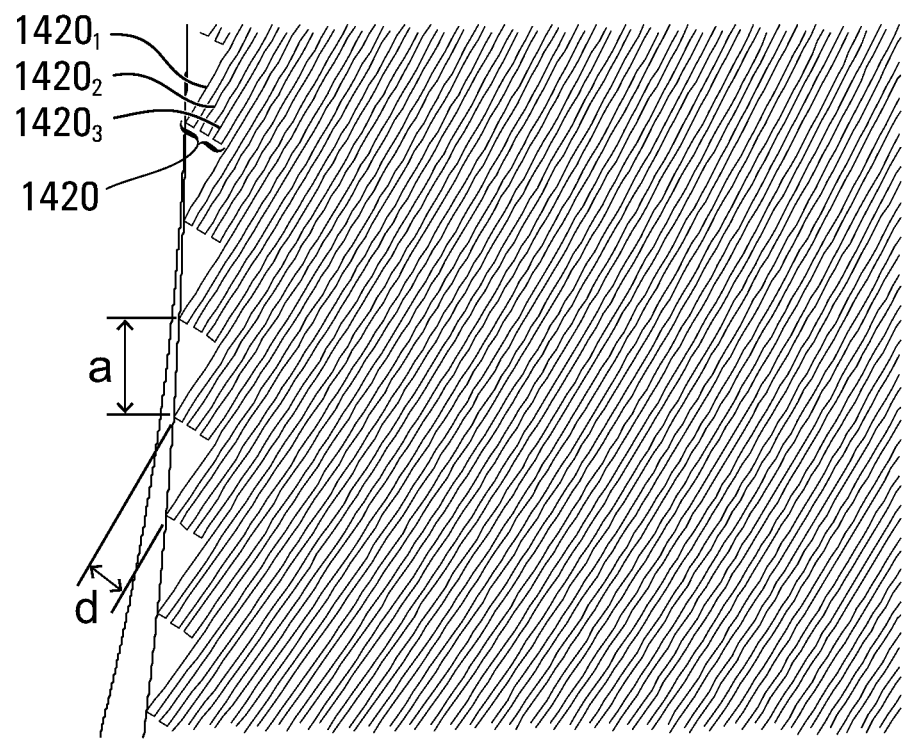
FIG. 14B is an elliptical DBR diffraction grating made with three curved stripes per grating period.

FIG. 14A illustrates an example in which a single stripe occurs in a repeating pattern, having a grating period "a" much along the lines of what has been described above with reference to FIG. 13. A Bragg period corresponds to the localized perpendicular distance between adjacent stripes, indicated by "d". Therefore, in FIG. 14A for a grating period of "a", there is a single Bragg period. FIG. 14B illustrates an example in which a grouping 1420 of three stripes 1420$_1$, 1420$_2$, 1420$_3$ occur in a repeating pattern. This approach may result in a pattern, for example, in which groupings of the three stripes have a period, "a", the same as the individual stripes of FIG. 14A, such that the three stripes are thinner and the material between the three stripes and sets of stripes is thinner. In a case where the localized perpendicular distance between every third stripe, as in FIG. 14B, is equal to the localized perpendicular distance between adjacent stripes in FIG. 14A, the grating period is "a", but there are now three Bragg periods. FIG. 14B is but an example and it is to be understood that the groupings of lines could be two lines, or more than three lines. Ultimately, the number of lines is an implementation specific variable.

In an alternative scenario, (not shown) if the localized perpendicular distance between adjacent stripes was equivalent to the spacing in FIG. 14A, but the grating is still formed using three stripes in the manner of FIG. 14B, then the grating period would be equivalent to "3a".

Figure 19A:
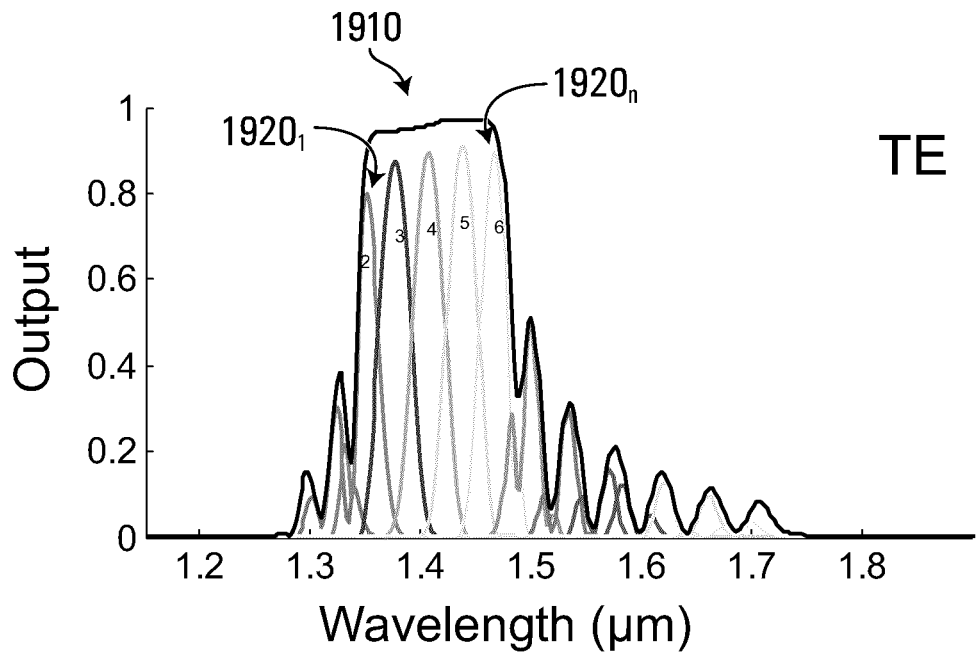
FIGS. 19A and 19B are graphical plots of optical output through individual channels of an elliptical DBR diffraction grating (Case 4) according to two embodiments of the invention and for the overall bandwidth of all of the individual channels, for TE polarization.
Figure 19B:
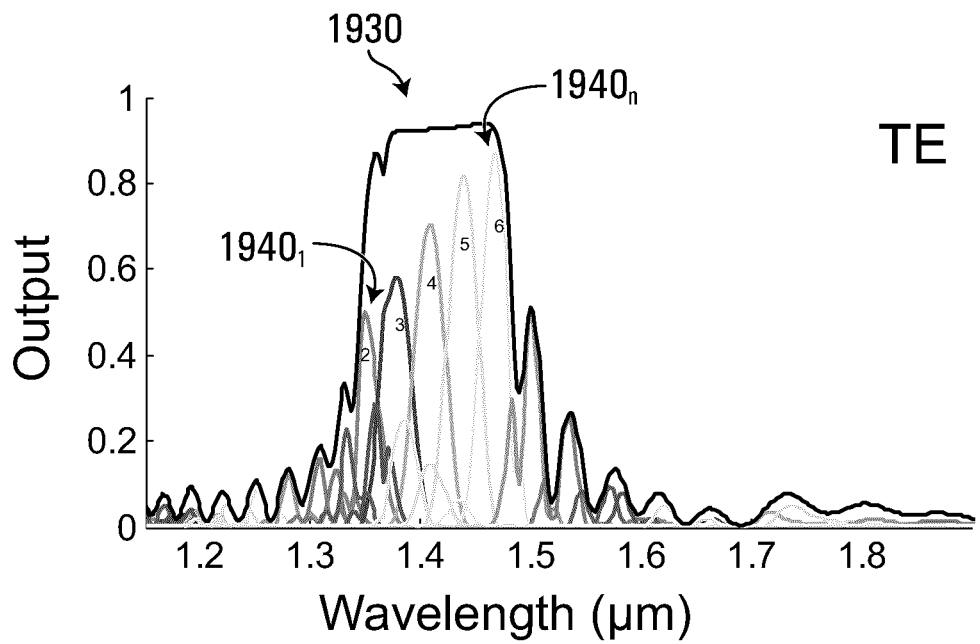

FIG. 19A shows a simulation of the efficiency of a two-material grating for TE polarization, based on the following parameters: $n_1=3.5$, $n_2=1$, $\lambda=1.5$ μm, $M=-2$, $\alpha=-45°$, $\theta=-30°$, $R_{RC}=70$ μm, $a=710$ nm, $f_2=0.1$. The grating contains one Bragg mirror period per diffraction grating period, which corresponds to the grating illustrated in FIG. 14A. FIG. 19B shows a simulation of the efficiency of a grating having similar localized perpendicular distance between adjacent stripes as the grating for which the simulation of FIG. 19A was performed, but the grating period is three times the grating period of the grating for which the simulation was performed for FIG. 19A and a single grating period corresponds to 3 Bragg periods.

In the plots of FIGS. 19A and 19B the x and y-axes are for a wavelength range of approximately 1.15 μm t 1.9 μm and normalized to unity, respectively. In FIG. 19A reference character 1910 illustrates the passband of the overall bandwidth and reference characters 1920$_1$ and 1920$_n$ identify two individual channels in the overall bandwidth 1910 for TE polarization for the grating as described above. In FIG. 19B reference character 1930 illustrates the passband of the overall bandwidth and reference characters 1940$_1$ and 1940$_n$ identify two individual channels in the overall bandwidth 1930 for TE polarization for the other grating described above. The reflection efficiency increases to 73% (TE) and 82% (TM), which is an improvement compared to the previously described one-piece metallic grating. Based on the geometry of the grating design there is only a limited amount of energy that is lost to other diffraction orders and therefore, it can be considered that the other diffraction orders are substantially eliminated.

In the case of FIG. 19A, the efficiency is higher than for the case of FIG. 19B. This arises from the fact that for the grating for which the simulation is performed for FIG. 19B, the grating period is three times the grating period of the grating for which the simulation is performed for FIG. 19A, which generates additional diffraction orders due to the fact that there are multiple stripes forming a single grating period.

Figure 15A:
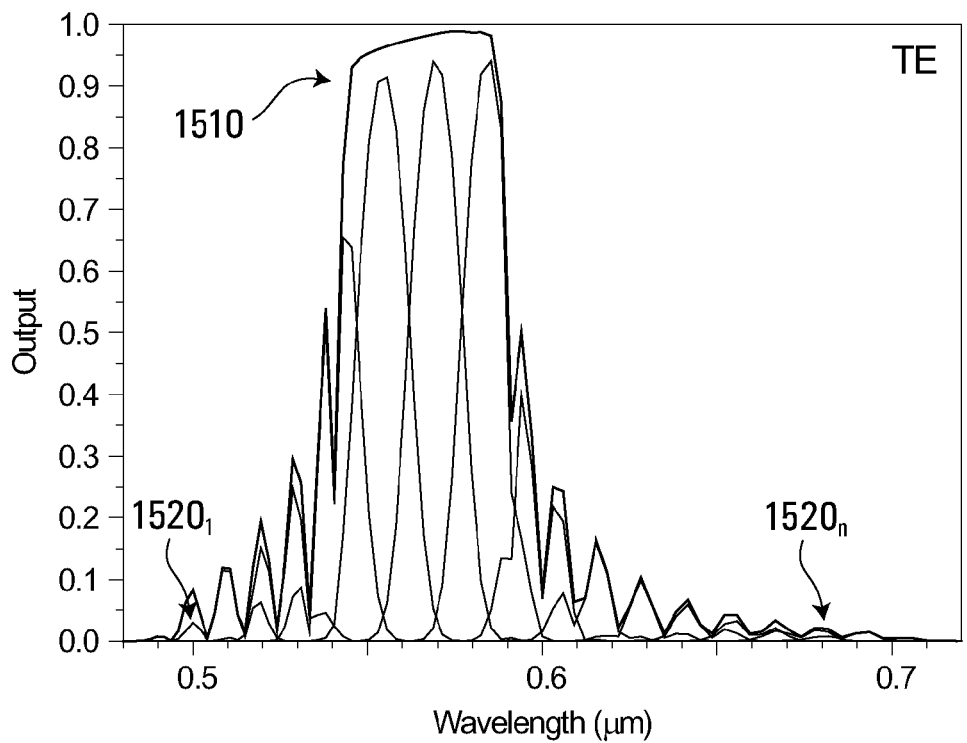
FIGS. 15A and 15B are graphical plots of optical output through individual channels of an elliptical DBR diffraction grating (Case 4) according to an embodiment of the invention and for the overall bandwidth of all of the individual channels, for TE and TM polarizations, respectively.
Figure 15B:
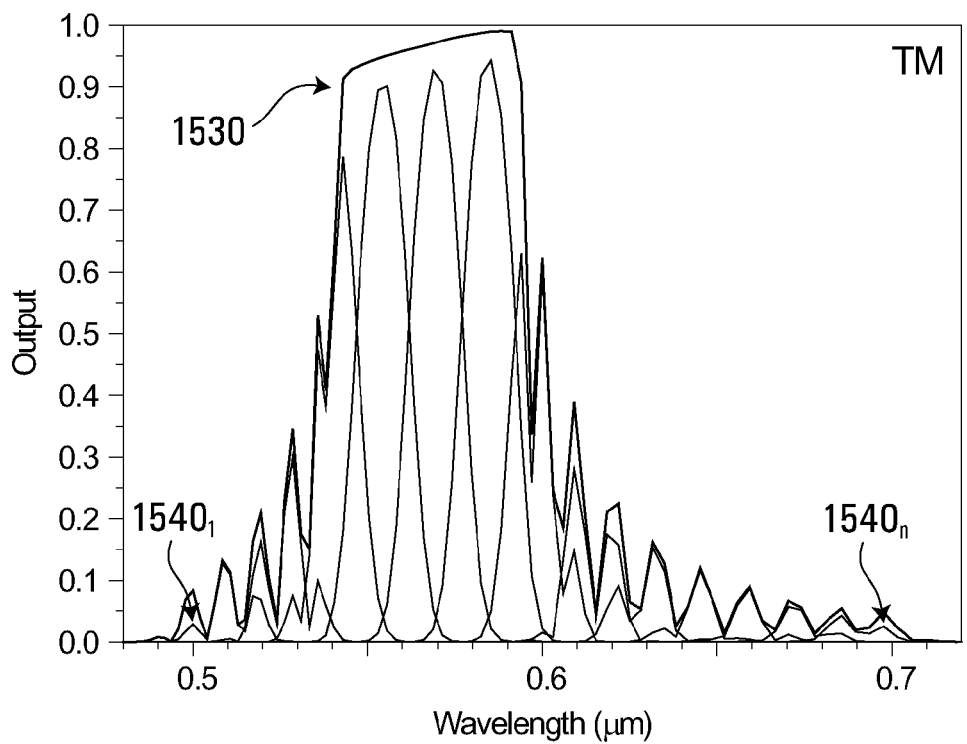

FIGS. 15A and 15B show a simulation of the efficiency of a grating for TE and TM polarization, respectively, as described with reference to FIG. 8, but for the dielectric stack embodiment (Case 4). The general parameters used for the simulation of FIGS. 15A and 15B are substantially the same as were defined above for the simulations of FIGS. 3A, 3B, 5A and 5B. The key difference is that the grating is now a series of dielectric elements having an index of refraction that is different than the index of refraction around them, spaced parallel to one another in an elliptical arrangement with the input and output channels located at the foci of the ellipse formed by the grating. In some embodiments the elements having the index $n_2$ may be air grooves and the material around the dielectric elements having an index $n_1$ may be silica. A non-exhaustive list of materials of index $n_1$ includes: silica, silicon, III-V semiconductor (in particular GaAs and InP related materials), and polymer with an index of refraction different than $n_2$. Material having the index $n_2$ include solids, liquids or gases. A non-exhaustive list of particular examples further include: air, vacuum, silica, silicon, III-V semiconductor (in particular GaAs and InP related materials), polymer with an index of refraction different than $n_1$, obtained by example using a different composition or doping. Particular $n_2/n_1$ implementations may include: silica ($n_2$) in silica ($n_1$), air ($n_2$) in silica ($n_1$), air ($n_2$) in silicon ($n_1$), silica ($n_2$) in silicon ($n_1$).

In the plots of FIGS. 15A and 15B the x and y-axes are the same wavelength range and normalized output as that of FIGS. 3A and 3B. In FIG. 15A reference character 1510 illustrates the passband of the overall bandwidth and reference characters 1520$_1$ and 1520$_n$ identify two individual channels in the overall bandwidth 1510 for TE polarization.

In FIG. 15B reference character 1530 illustrates the passband of the overall bandwidth and reference characters 1540$_1$ and 1540$_n$ identify two individual channels in the overall bandwidth 1530 for TM polarization. In this simulation the width of the dielectric element is $d_2=80$ nm. The reflection efficiency of this grating goes up to 99% (TE and TM). Although being only an approximation of an ideal case, practically all the light gets diffracted in only one particular direction, making this dielectric device a real mono-order diffraction grating. The diffracted single beam appears clearly as modelled in FIGS. 16A and 16B.

Figure 16A:
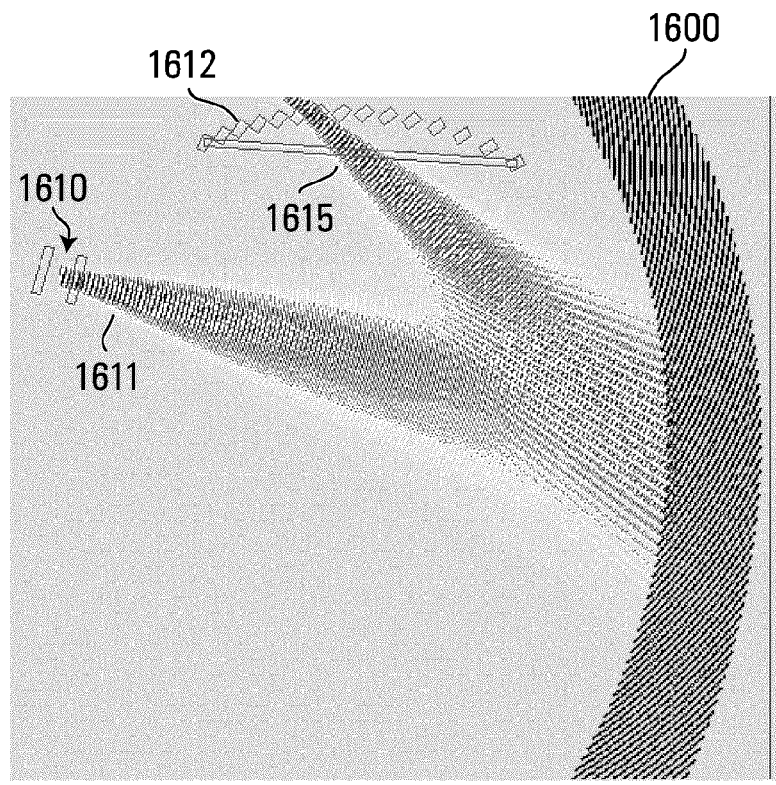
FIGS. 16A and 16B are schematic diagrams of a modelled spatial distribution of light of an elliptical DBR diffraction grating (Case 4) for TE and TM polarizations, respectively.
Figure 16B:
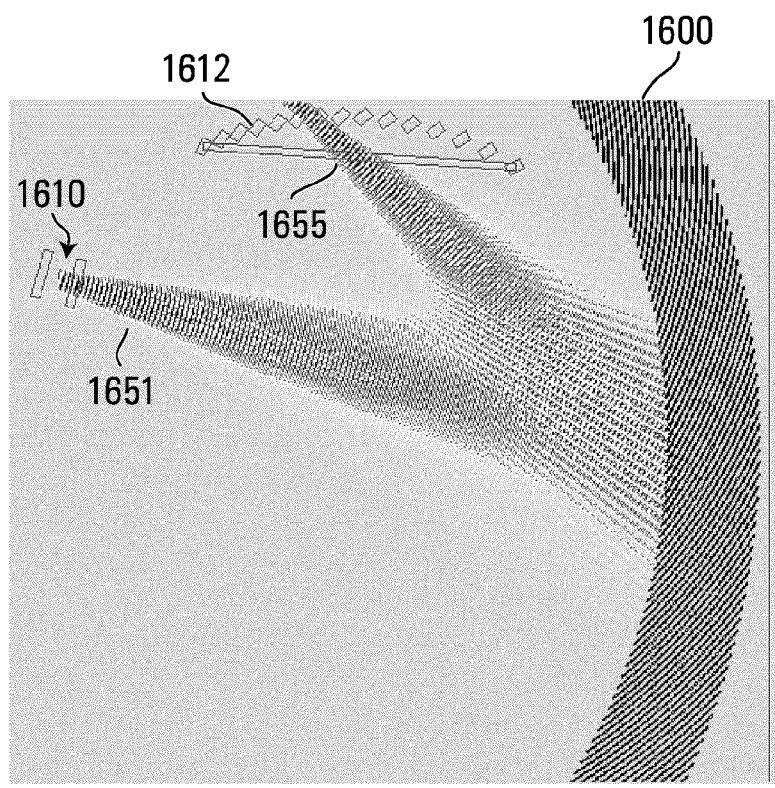

FIGS. 16A and 16B are further simulations which show the lack of other diffraction orders. Only a single diffraction order is shown 1615 and 1655 in the TE and TM modes in FIGS. 16A and 16B, respectively. In FIG. 16A for TE polarization, reference number 1610 denotes an input source and reference number 1611 denotes the continuous wave from the input source 1610. The continuous wave 1611 impinges on the diffraction grating 1600 and one order 1615 is directed to an array of outputs 1612. In FIG. 16B for TM polarization, a similar phenomenon can be seen in which a continuous wave 1651 from input source 1610 generates one order 1655 directed to the outputs 1612. The polarization-dependant loss of this device is 0.07 dB.

The width of the dielectric element can be adjusted. Narrowing the element enables the efficiency of the grating to approach the theoretical limit, but as the stopband of the Bragg mirror gets narrower, at some point the efficiency begins to drop. Widening the element has the effect of increasing the stopband by having an improved Bragg mirror implementation, but the Bragg condition shifts in wavelength compared to the grating diffraction condition, so the combination of the two conditions looses efficiency. Further widening of the element moves away from the best Bragg mirror situation and eventually the efficiency drops significantly. An illustration of these effects is represented in FIGS. 17A to 17I.

Figure 17A:
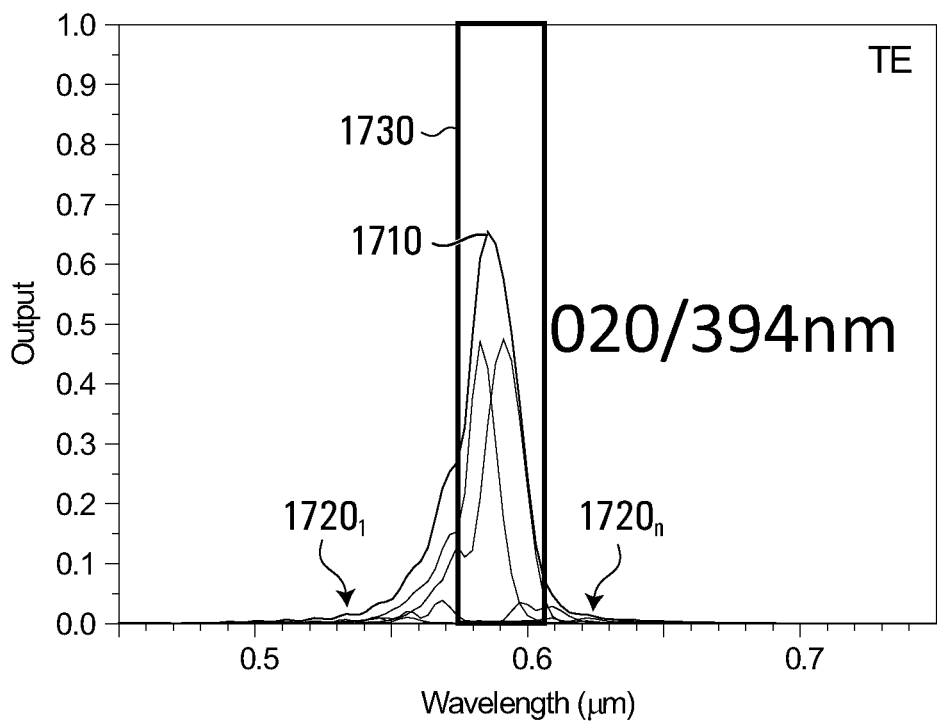
FIGS. 17A to 17I are graphical plots of spectral efficiency of the (Case 4) grating, for several widths of stripe, with Bragg mirror stopband superimposed.

FIG. 17A shows a simulation of the efficiency of a grating for TE polarization as described with reference to FIG. 8, but for a dielectric stack in which the dielectric elements are 20 nm thick. The general parameters used for the simulation of FIG. 17A are substantially the same as were defined above for the simulations of FIGS. 3A, 3B, 5A and 5B. In the plot of FIG. 17A the x and y-axes are similar to the wavelength range and normalized output as that of FIGS. 3A and 3B. Reference character 1710 illustrates the passband of the overall bandwidth with reference characters 1720$_1$ and 1720$_n$ identify two individual channels in the overall bandwidth 1710 for TE polarization. Reference character 1730 is a representation of the stopband of the Bragg mirror, which has been superimposed on the plot indicating the wavelength range of the grating.

Figure 17B:
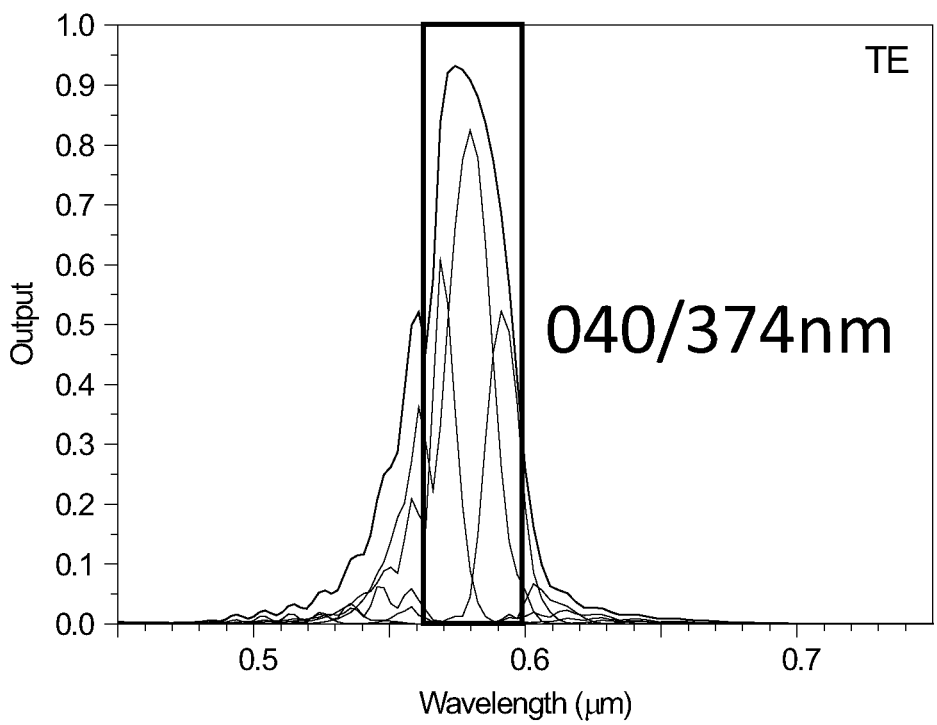
Figure 17C:
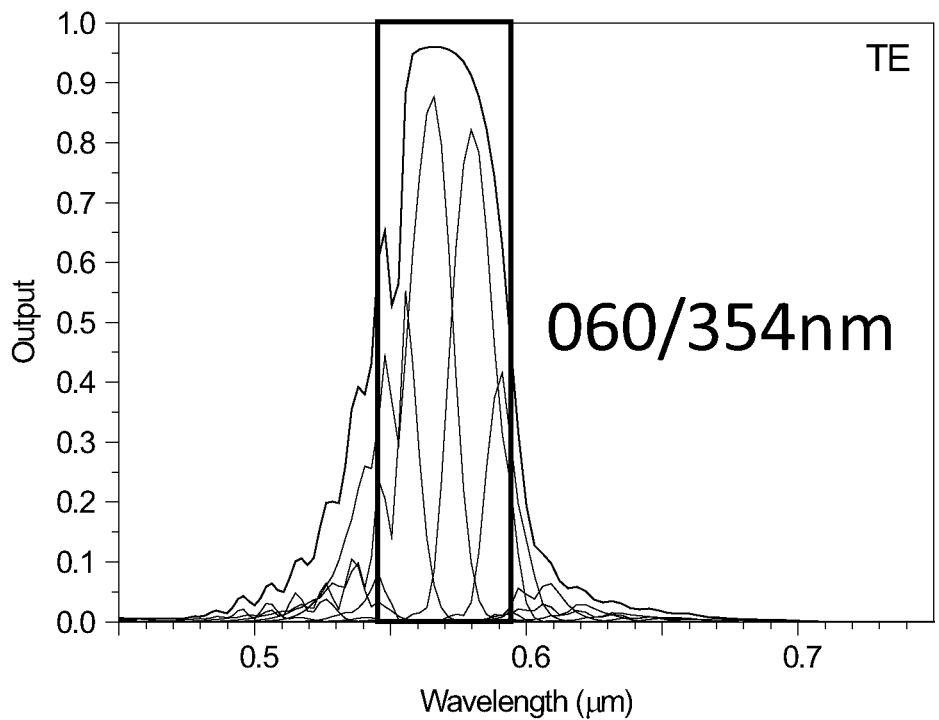
Figure 17D:
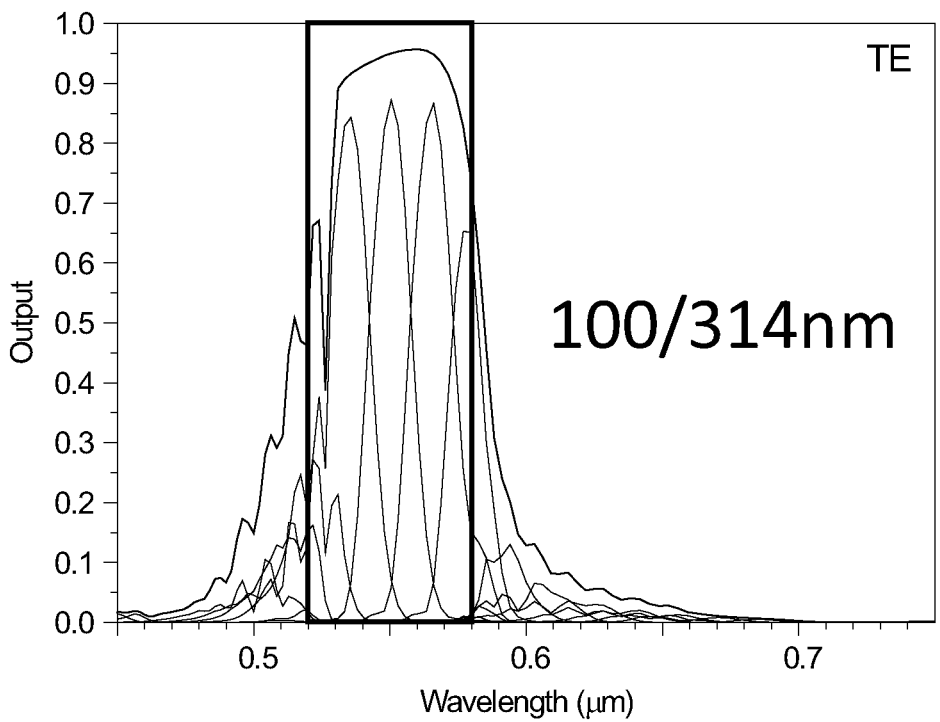
Figure 17E:
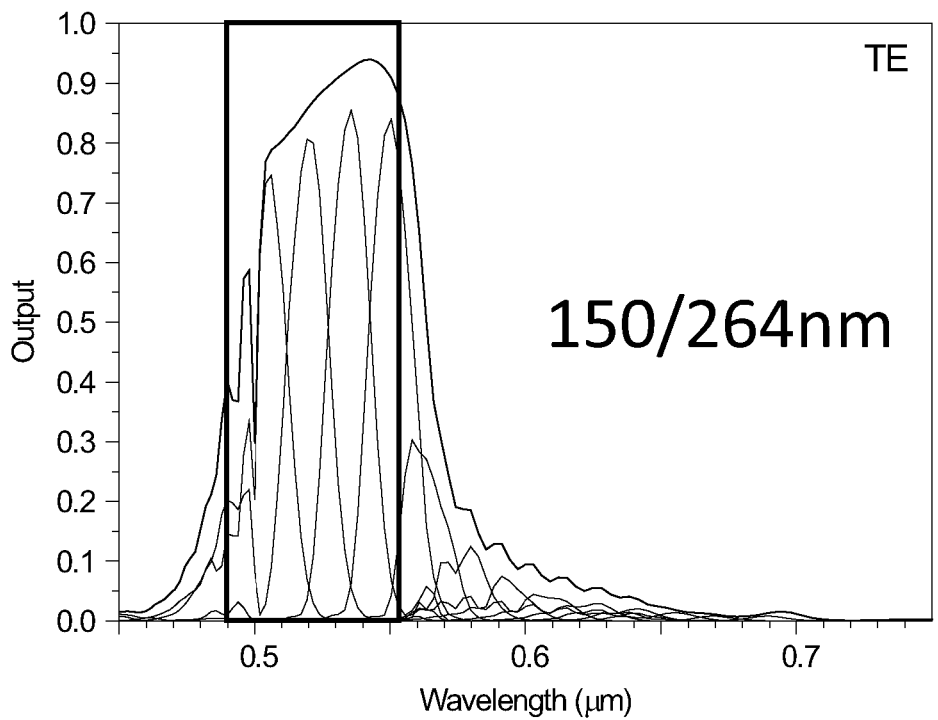
Figure 17F:
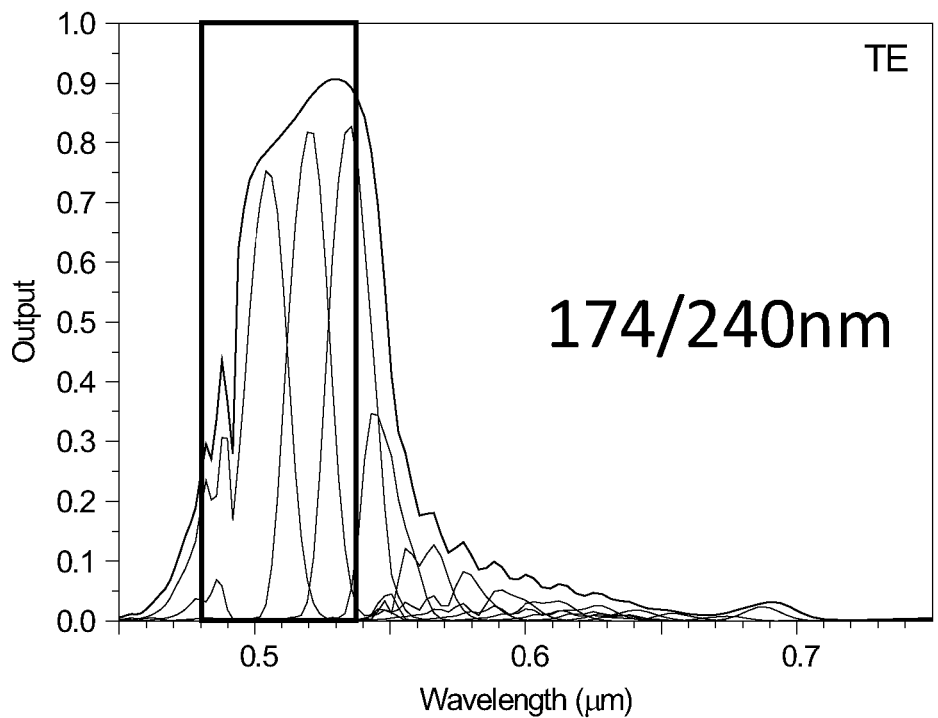
Figure 17G:
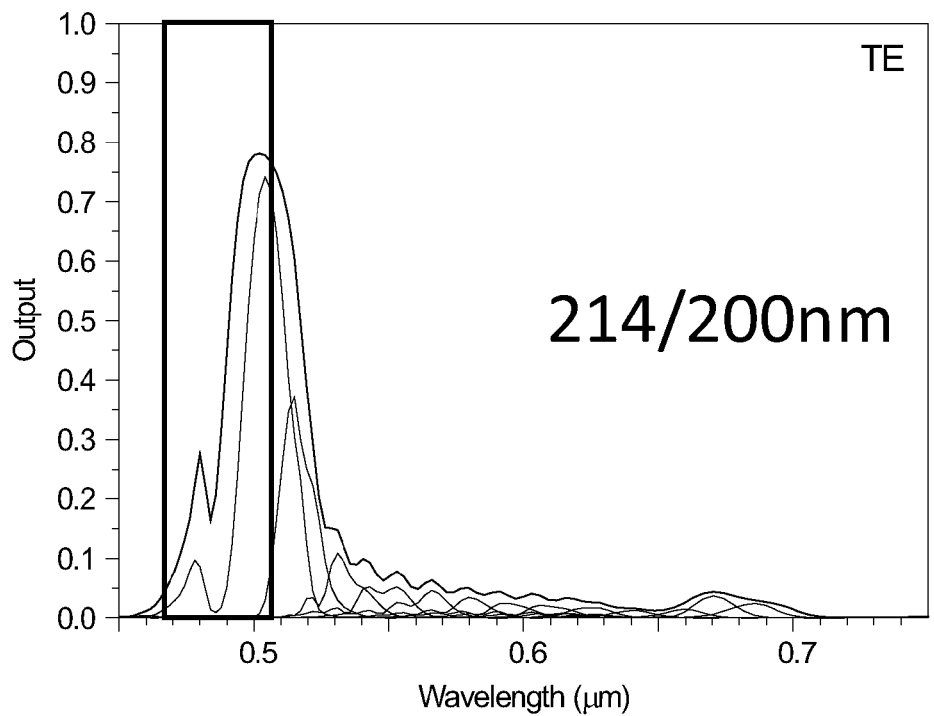
Figure 17H:
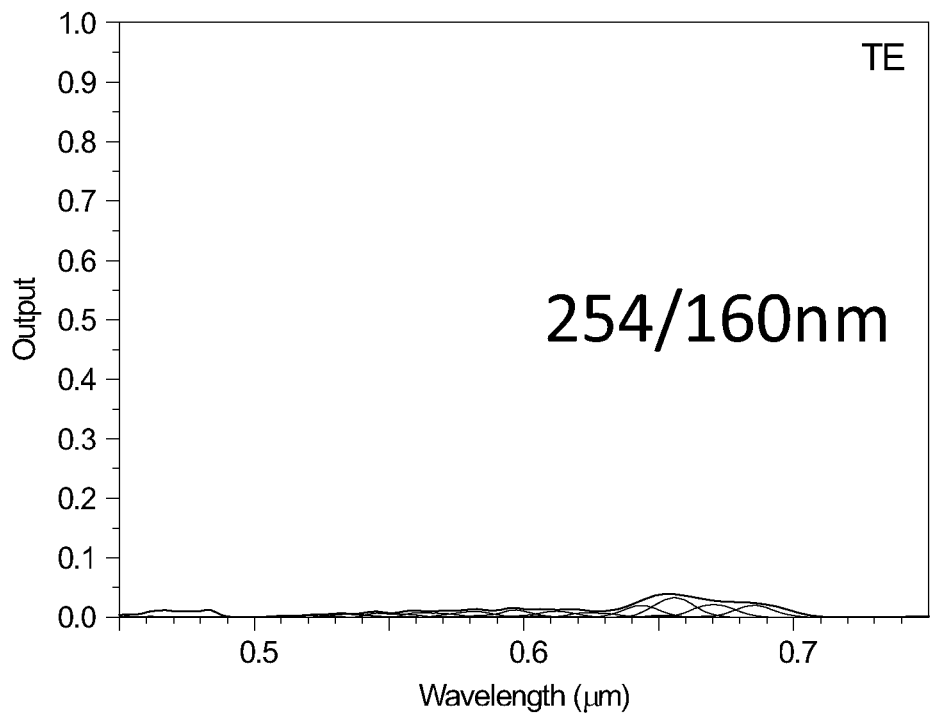
Figure 17I:
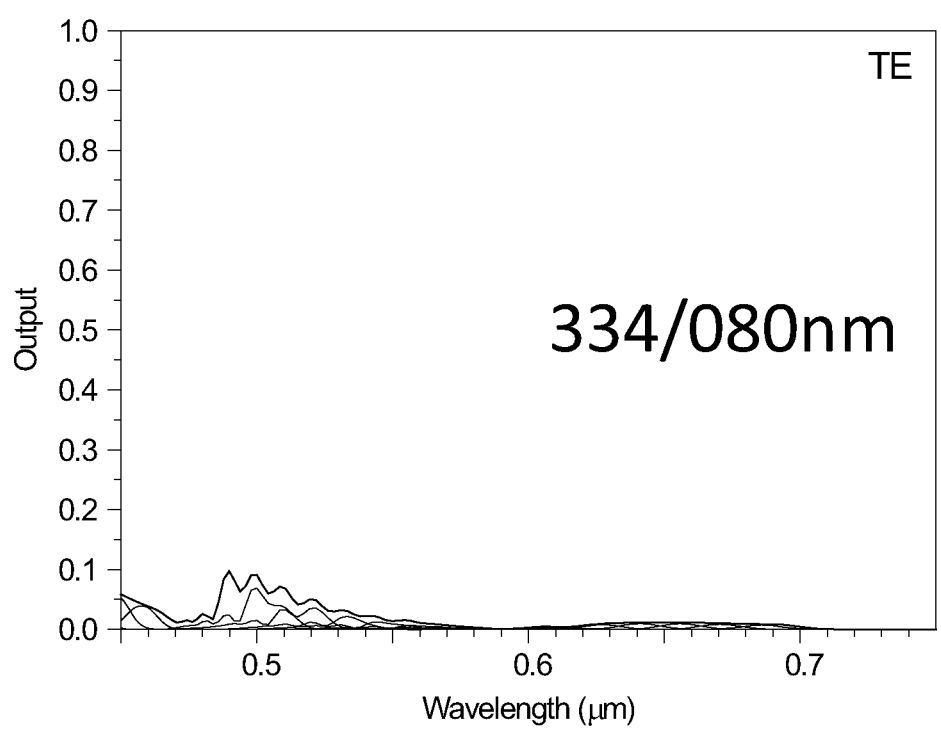

FIGS. 17B to 17I illustrate the evolution of the bandwidth and efficiency of the grating for an increased thickness of the dielectric elements. In FIG. 17B the thickness is 40 nm. In FIG. 17C the thickness is 60 nm. In FIG. 17D the thickness is 100 nm. In FIG. 17E the thickness is 150 nm. In FIG. 17F the thickness is 174 nm. In FIG. 17G the thickness is 214 nm. In FIG. 17H the thickness is 254 nm. In FIG. 17I the thickness is 334 nm.

Having narrow elements also presents an advantage when their refractive index ($n_2$) is small compared to the surrounding one ($n_1$). Such a scenario may occur when grooves are etched in a bulk optics media and left empty, i.e. there is air in the elements, and the interface is between the bulk optics media and air. Open areas can be sources of loss in the $3^{rd}$ dimension (vertical), since the vertical guiding of the slab waveguide is locally interrupted.

The Bragg mirror is not independent of the grating as the optical paths have to match at the reconstruction of the beam after reflection off the grating. In some situations an exact solution exists. In some situations a "compromise" has to be found, and the quarter wave configuration as proposed in U.S. Patent Application Publication No. US20070086703 (published on Apr. 19, 2007), although intuitively a good one, is not necessarily the best one. The efficiency in U.S. Patent Application Publication No. US20070086703 gets limited to 80%, whereas with some configurations of the present invention disclosed herein, an efficiency of 99% may be reached. Also, the bandwidth at 90% of efficiency maximum is 4.6% for U.S. Patent Application Publication No. US20070086703, and in some embodiments of the present invention the bandwidth at 90% of efficiency maximum is 7.5%, and may be able to be increased, as seen in FIGS. 17A to 17I.

An important aspect of diffraction gratings also concerns polarization issues. The polarization-dependant loss (PDL) and polarization-dependant wavelength shift (PDW) of the four grating configurations, namely Cases 1 to 4 described above, has been estimated in Table 1 below.

TABLE 1

PDL and PDW for Four Grating Configurations

| | Case | | | | | | | |
|---|---|---|---|---|---|---|---|---|
| | 1 | | 2 | | 3 | | 4 | |
| | Channels | | | | | | | |
| | 1-13 | 4-6 | 1-13 | 4-6 | 1-13 | 4-6 | 1-13 | 4-6 |
| PDL (dB) | 7.7 | 7.0 | 3.6 | 3.5 | 1.16 | 0.80 | n/a | 0.07 |
| PDW (nm) | 0.6 | 0.6 | 0.5 | 0.3 | 0.1 | 0.1 | n/a | 0.1 |

The classical grating (Case 1), with its low efficiency, is very dependent on polarization (PDL of 7.7 dB, PDW of 0.6 nm). The one-piece metallic grating (Case 2) is quite dependent on polarization, with a PDL of 3.6 dB over channels 1-13 and a PDW of 0.5 nm. By using a series of thin lines of metal (Case 3), the grating device is less polarization-dependent, with a PDL of 1.16 dB and PDW of 0.1 nm. With a fully dielectric grating (series of dielectric elements, Case 4), the PDL is decreased further to 0.07 dB over available channels 4-6. This shows that the DBR-grating configuration of the present invention also improves significantly the independency to polarization, which is an important element in systems such as WDM and spectrometers.

Figure 18:
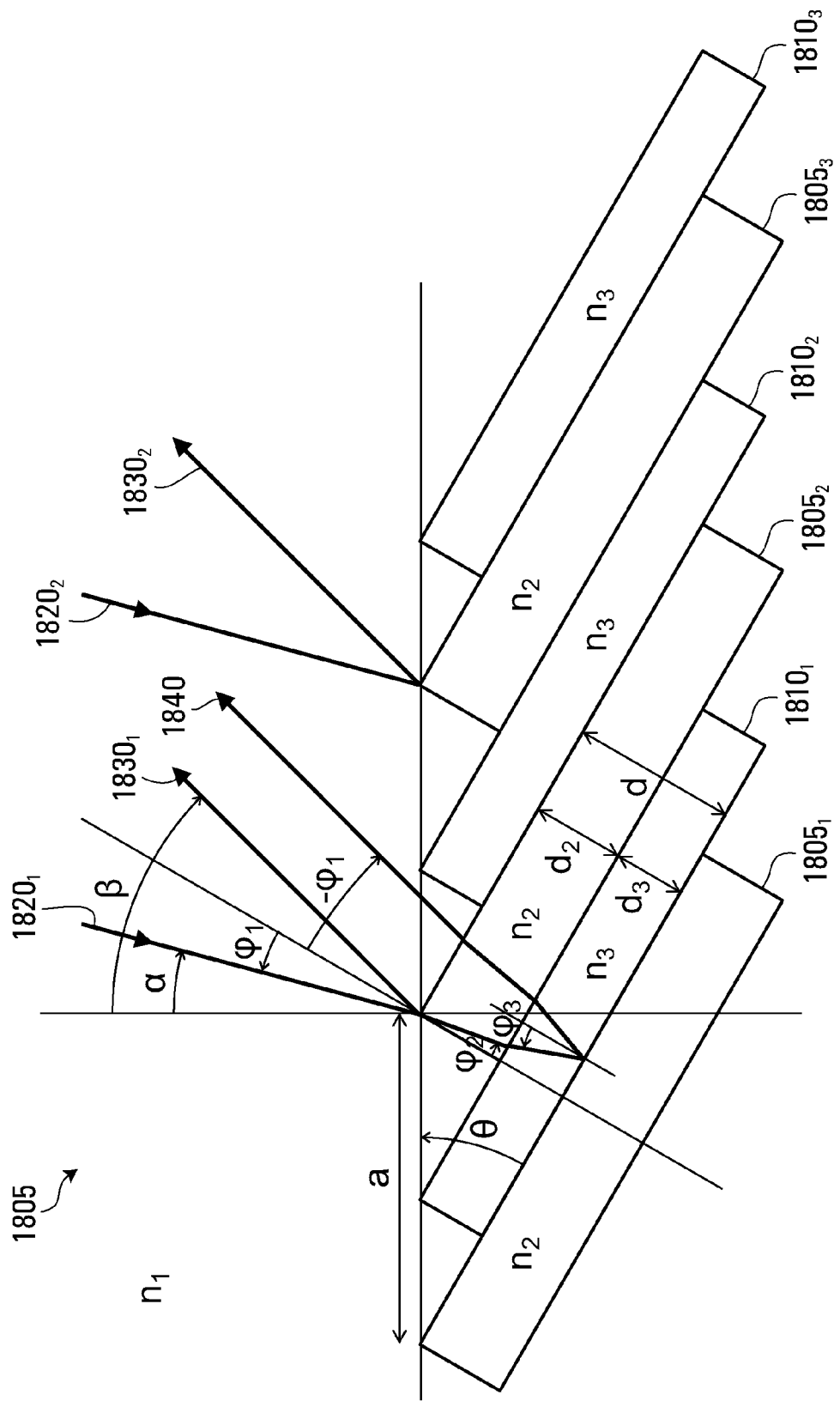
FIG. 18 is a schematic diagram illustrating a three-material system diffraction grating, with diffraction conditions and Bragg conditions, according to an embodiment of the invention.

In some embodiments, a third material having an index of refraction $n_3$ can be used in the grating, as will be discussed with reference to FIG. 18. FIG. 18 illustrates an example similar to FIG. 13, but instead of the volume between the elements $1310_1$ to $1310_5$ having a same index of refraction as the region of incident, i.e. $n_1$, the volume between the elements $1310_1$ to $1310_5$ is a different index than either the region of incidence or the elements $1310_1$ to $1310_5$. An implementation of this as illustrated in FIG. 18, shows the diffraction grating region now composed of stripes of index $n_2$ and thickness $d_2$ alternating with stripes of index $n_3$ and thickness $d_3$. The region of incidence remains as it is, with index $n_1$.

FIG. 18 is a schematic representation of two rays of light impinging on elements that form a portion of a diffraction grating that is substantially flat. While the grating is generally described herein as being a curved grating, in a localized area the curved grating can be considered flat. A first light ray $1820_1$, originally travelling in an area 1805 having an index of refraction $n_1$, is shown being re-emitted from the grating at a surface of element $1805_2$, which is an interface between a material having an index of refraction $n_1$ and $n_2$, and forming light ray $1830_1$. A portion of the first light ray $1820_1$ passes through the thickness $d_2$ of element $1805_2$ and then passes through the thickness $d_3$ of element $1810_1$ having index of refraction $n_3$, before reflecting off of the surface of element $1805_1$ as light ray 1840, which passes through the thickness $d_3$ of element $1810_1$ having index of refraction $n_3$ and passes through the thickness $d_2$ of element $1805_2$ before re-entering area 1805. A second light ray $1820_2$ is shown being re-emitted from the grating at a surface of element $1805_3$, which is an interface between materials having indices of refraction $n_1$ and $n_2$, and forming light ray $1830_2$. Additionally in FIG. 18, $\alpha$ and $\beta$ are the incident and diffracted angles of the light rays with regard to a direction that is normal to the grating plane, $\phi_1$ is the incident angle of the light rays with regard to a direction that is normal to the dielectric element, $\theta$ is the inclination of the grating dielectric element with respect to the grating plane, a is the period of the grating with regard to the elements having the index of refraction $n_2$ and thickness $d_2$, d is the periodic distance between two dielectric elements in a direction perpendicular to the dielectric elements, $\lambda$ is the wavelength, $n_1$ is the index of refraction of the area adjacent the grating, $n_2$ is the index of refraction of the dielectric elements having a thickness $d_2$, $n_3$ is the index of refraction of the dielectric elements having a thickness $d_3$, and m and M are two integers (not shown in the figure), respectively corresponding to the Bragg diffraction order and grating diffraction order.

The Bragg condition now becomes:

$$m\lambda = 2d\left[(1-f_2)n_3\cos\varphi_3 + f_2 n_2\sqrt{1-\left(\frac{n_3}{n_2}\right)^2\sin^2\varphi_3}\right], \quad (9)$$

and its combination with the diffraction grating condition leads to:

$$f_2 = \frac{\frac{m}{M}\cos\left(\frac{\alpha-\beta}{2}\right) + \sqrt{\left(\frac{n_3}{n_1}\right)^2 - \sin^2\left(\frac{\alpha-\beta}{2}\right)}}{\sqrt{\left(\frac{n_3}{n_1}\right)^2 - \sin^2\left(\frac{\alpha-\beta}{2}\right)} - \sqrt{\left(\frac{n_2}{n_1}\right)^2 - \sin^2\left(\frac{\alpha-\beta}{2}\right)}}, \quad (10)$$

where $$f_2 = \frac{d_2}{d}$$

and $d=d_1-d_2$ in order to determine the stripe width. Alternatively, $n_3$ can be determined in function of $f_2$:

$$\frac{n_3}{n_1} = \sqrt{\frac{1}{(1-f_2)^2}\left[\frac{m}{M}\cos\left(\frac{\alpha-\beta}{2}\right) + f\sqrt{\left(\frac{n_2}{n_1}\right)^2 - \sin^2\left(\frac{\alpha-\beta}{2}\right)}\right]^2 + \sin^2\left(\frac{\alpha-\beta}{2}\right)}.$$

(11)

The Bragg condition can then in this case be exactly matched with the diffraction grating condition, in particular for m=leading to high efficiency at and around the design wavelength.

All the previous aspects mentioned for a two-material situation (with $n_1$ and $n_2$) can apply to the three-material situation (with $n_1$, $n_2$ and $n_3$). This includes, but is not restricted to, the geometric configurations, the possible progressive change of index of refraction normal to and/or along the stripes, and the materials used.

In some embodiments, the grating can be used as a WDM component for optical networks. In some embodiments, the grating can be used for miniaturized spectrometers. For example the miniaturized spectrometers can be used for sensing applications. Because of the high efficiency that has been shown, in some embodiments the gratings are also suitable for low signal detection.

The grating may be particularly useful in WDM systems that will use a huge number of channels (e.g. ≥512). The grating may also be particularly useful for wavelength multiplexed optical interconnects.

A trend of using higher index contrast waveguides and photonic wires to reduce bend radii in WDM chips is expected in the future. CDGs could benefit more from using higher index contrast technology that provides size reduction. Both CDGs and AWGs would get shorter access waveguides, but the size reduction could be critical or detrimental in the arrayed waveguides region for the wavelength separation functioning because of the present limitations of this high index contrast technology (variations of waveguide characteristics from fabrication irregularity, losses from sidewall roughness). Since CDGs don't use arrayed waveguides, they would get the advantages of high index contrast technology and not the disadvantages.

Numerous modifications and variations of the present application are possible in light of the above teachings. It is therefore to be understood that within the scope of the appended claims, the embodiments of the application may be practised otherwise than as specifically described herein.

The invention claimed is:

1. A device comprising:
   an arrangement of a plurality of adjacent linear, elliptically shaped elements, each of the elements having a finite thickness, wherein each linear element, along its length, is locally parallel to an adjacent linear element in a direction substantially normal to the linear element;
   a grating surface defined by portions of at least a subset of the plurality of elements;
   a first port and at least one second port located at foci of an ellipse defining the elliptical shape of the plurality of elements.

2. The device of claim 1, wherein the plurality of elements each have a reflective metalized surface.

3. The device of claim 1, wherein the plurality of elements substantially form a Bragg reflective grating.

4. The device of claim 1, wherein the first port and at least one second port fall on a Rowland circle, and at least a portion of the grating surface falls on the Rowland circle.

5. The device of claim 1 in which the device uses a combination of materials having indices of refraction $n_2$ and $n_1$ and include at least one of:
   silica ($n_2$) in silica ($n_1$);
   air ($n_2$) in silica ($n_1$);
   air ($n_2$) in silicon ($n_1$); and
   silica ($n_2$) in silicon ($n_1$).

6. A device which has a diffraction grating comprising a plurality of adjacent linear elements, wherein each linear element, along its length, is substantially locally parallel to an adjacent linear element in a direction substantially normal to the linear element and wherein the elements providing the reflection are curved for their reflective properties in relation to their neighbours and/or for focusing.

7. The device according to claim 6, wherein the elements providing the reflection are substantially locally parallel.

8. The device according to claim 6, wherein the elements providing the reflection are substantially locally equidistant from one another.

9. The device according to claim 6, wherein the elements providing the reflection each have a substantially elliptical shape to provide output efficiency and aberration-free focusing with foci located at a device input and a device output.

10. The device according to claim 6, wherein the elements providing the reflection are metallic.

11. The device according to claim 6, wherein the elements providing the reflection are dielectrics.

12. The device according to claim 6, wherein a grating diffraction condition and a Bragg condition are based on different optical path differences, but each optical path difference is substantially a multiple of one or more wavelengths.

13. The device according to claim 6, wherein the elements providing the reflection are air, gas or vacuum grooves in any one of: silicon dioxide; silicon; and III-V semiconductor elements.

14. The device according to claim 6, wherein the elements providing the reflection present a progressive change of index of refraction or material composition.

15. The device according to claim 6, wherein at least a part of the refractive index or material composition distribution of the elements providing the reflection presents an apodization along the direction locally perpendicular to the diffraction grating or along the direction of the length of the elements.

16. The device according to claim 6 based on the Rowland configuration, where light input and light output locations are substantially on the Rowland circle and where the grating front is tangent to the Rowland circle and has a radius of curvature substantially twice the Rowland circle radius.

17. A planar waveguide grating device comprising at least an input channel waveguide or at least an input location and a plurality of output channel waveguides or a plurality of output locations, wherein the grating element that spatially separates wavelengths supplied by the input channel waveguide comprises the device according to claim 6.

18. The planar waveguide grating device according to claim 17, based on geometrical configuration which allows the light emanating from the input location or channel waveguide extremity to be collected by the output locations or channel waveguides extremities.

19. The planar waveguide grating device according to claim 17 such that a mean penetration depth of light into the grating corresponds substantially to the position of a regular grating front.

20. The planar waveguide grating device according to claim 17, where the channel waveguides have a free orientation, in particular the one to maximize the light efficiency coupling into them.

21. The planar waveguide grating device according to claim 17, used for integrated spectrometers or for spectral measurement on a lab on a chip.

22. The planar waveguide grating device according claim 17 that is used for wavelength selection of an optical source, wherein the output or input channel waveguides could be used for, or replaced by, selective elements operating reflection, transmission, absorption, or other light manipulation.

23. The device according to claim 6, wherein at least two materials having different indices of reference are used in fabricating the device.

24. The device according to claim 6, wherein at least a part of the diffraction grating has a non-constant period.

* * * * *